US008747219B2

(12) United States Patent
Wright et al.

(10) Patent No.: US 8,747,219 B2
(45) Date of Patent: Jun. 10, 2014

(54) COMMUNITY GAME WITH PLAYER-CONFIGURABLE PARAMETERS

(71) Applicant: WMS Gaming, Inc., Waukegan, IL (US)

(72) Inventors: Tracey L. Wright, West Chicago, IL (US); Dion K. Aoki, Chicago, IL (US); Andrew C. Guinn, Chicago, IL (US); Joel R. Jaffe, Glenview, IL (US); Robert L. Kyte, Chicago, IL (US); Bradley D. Schultz, Las Vegas, NV (US)

(73) Assignee: WMS Gaming, Inc., Waukegan, IL (US)

( * ) Notice: Subject to any disclaimer, the term of this patent is extended or adjusted under 35 U.S.C. 154(b) by 0 days.

(21) Appl. No.: 13/767,744

(22) Filed: Feb. 14, 2013

(65) Prior Publication Data

US 2013/0217477 A1 Aug. 22, 2013

Related U.S. Application Data

(60) Provisional application No. 61/600,261, filed on Feb. 17, 2012, provisional application No. 61/600,253, filed on Feb. 17, 2012.

(51) Int. Cl.

| | |
|---|---|
| *A63F 13/00* | (2014.01) |
| *A63F 9/24* | (2006.01) |
| *G07F 17/32* | (2006.01) |

(52) U.S. Cl.

CPC .................................... *G07F 17/32* (2013.01)
USPC ................................ 463/25; 463/16; 463/20

(58) Field of Classification Search

CPC ..................................................... G07F 17/32
USPC ............................................... 463/16, 20, 25
See application file for complete search history.

(56) References Cited

U.S. PATENT DOCUMENTS

| | | | |
|---|---|---|---|
| 4,861,041 | A | 8/1989 | Jones et al. |
| 5,275,400 | A | 1/1994 | Weingardt et al. |
| 5,417,430 | A | 5/1995 | Breeding |
| 5,482,289 | A | 1/1996 | Weingardt |
| 5,564,700 | A | 10/1996 | Celona |
| 5,577,731 | A | 11/1996 | Jones |
| 5,655,961 | A | 8/1997 | Acres et al. |

(Continued)

FOREIGN PATENT DOCUMENTS

| | | |
|---|---|---|
| WO | WO-9915246 | 4/1999 |
| WO | WO-2005113088 | 12/2005 |

(Continued)

*Primary Examiner* — Dmitry Suhol
*Assistant Examiner* — Jason Yen
(74) *Attorney, Agent, or Firm* — DeLizio Gilliam, PLLC

(57) ABSTRACT

A method includes receiving wagers from a player to play respective plays of a plurality of plays of a wagering game having event eligibility that includes a time value and a multiplier value. The method includes increasing at least one of the time value and the multiplier value as a function of the plurality of plays of the wagering game and decrementing the time value as time elapses. In response to a triggering event while the event eligibility is above an eligibility threshold, the method includes allowing the player to participate in one or more special events. The method includes allowing the player to configure at least one of a desired value of the multiplier value and a maximum value of the time value.

24 Claims, 27 Drawing Sheets

(56) References Cited

U.S. PATENT DOCUMENTS

| | | | |
|---|---|---|---|
| 5,722,890 | A | 3/1998 | Libby et al. |
| 5,743,800 | A | 4/1998 | Huard et al. |
| 5,766,076 | A | 6/1998 | Pease et al. |
| 5,851,011 | A | 12/1998 | Lott |
| 6,000,699 | A | 12/1999 | Long |
| 6,004,207 | A * | 12/1999 | Wilson et al. ................... 463/20 |
| 6,105,964 | A | 8/2000 | Maahs |
| 6,110,043 | A | 8/2000 | Olsen |
| 6,146,273 | A * | 11/2000 | Olsen .............................. 463/27 |
| 6,217,448 | B1 * | 4/2001 | Olsen .............................. 463/25 |
| 6,254,483 | B1 | 7/2001 | Acres |
| 6,331,148 | B1 | 12/2001 | Krause et al. |
| 6,358,149 | B1 | 3/2002 | Schneider et al. |
| 6,375,567 | B1 | 4/2002 | Acres |
| 6,409,602 | B1 | 6/2002 | Wiltshire et al. |
| 6,416,408 | B2 | 7/2002 | Tracy et al. |
| 6,416,409 | B1 | 7/2002 | Jordan |
| 6,435,510 | B2 | 8/2002 | Moore |
| 6,626,758 | B1 | 9/2003 | Parham et al. |
| 6,880,824 | B2 | 4/2005 | Thinnes |
| 7,255,645 | B2 | 8/2007 | Steil et al. |
| 7,931,530 | B2 | 4/2011 | Anderson et al. |
| 8,282,489 | B2 * | 10/2012 | Arezina et al. .................. 463/42 |
| 2002/0006822 | A1 | 1/2002 | Krintzman |
| 2002/0132660 | A1 | 9/2002 | Taylor |
| 2002/0187823 | A1 | 12/2002 | Khal |
| 2003/0030211 | A1 | 2/2003 | Brown |
| 2004/0063484 | A1 | 4/2004 | Dreaper et al. |
| 2004/0102238 | A1 | 5/2004 | Taylor |
| 2004/0102243 | A1 | 5/2004 | Olsen |
| 2004/0152511 | A1 | 8/2004 | Nicely et al. |
| 2005/0003886 | A1 | 1/2005 | Englman et al. |
| 2005/0017451 | A1 | 1/2005 | Ollington |
| 2005/0037837 | A1 | 2/2005 | Rowe |
| 2005/0059472 | A1 | 3/2005 | Joshi et al. |
| 2005/0075889 | A1 | 4/2005 | Gomes et al. |
| 2005/0159207 | A1 | 7/2005 | Thomas |
| 2005/0187014 | A1 | 8/2005 | Saffari et al. |
| 2006/0009280 | A1 | 1/2006 | Joshi et al. |
| 2006/0019744 | A1 | 1/2006 | Roemer |
| 2006/0035706 | A1 | 2/2006 | Thomas et al. |
| 2006/0287043 | A1 | 12/2006 | Englman et al. |
| 2007/0026941 | A1 | 2/2007 | Block et al. |
| 2007/0259711 | A1 | 11/2007 | Thomas |
| 2008/0113768 | A1 | 5/2008 | Baerlocher |
| 2008/0234041 | A1 * | 9/2008 | Berman .......................... 463/27 |
| 2009/0011823 | A1 | 1/2009 | Englman et al. |
| 2009/0042641 | A1 * | 2/2009 | Anderson et al. ............... 463/25 |
| 2010/0029367 | A1 | 2/2010 | Englman et al. |
| 2010/0227667 | A1 * | 9/2010 | Englman et al. ................ 463/20 |
| 2010/0267439 | A1 * | 10/2010 | Englman et al. ................ 463/20 |
| 2011/0034241 | A1 * | 2/2011 | Englman et al. ................ 463/27 |
| 2012/0028697 | A1 * | 2/2012 | Malt .............................. 463/20 |
| 2012/0184351 | A1 | 7/2012 | Hornik et al. |

FOREIGN PATENT DOCUMENTS

| | | |
|---|---|---|
| WO | WO-2006014770 | 2/2006 |
| WO | WO-2006014990 | 2/2006 |
| WO | WO-2006039349 | 4/2006 |
| WO | WO-2007117502 | 10/2007 |
| WO | WO-2011007940 | 1/2011 |

* cited by examiner

COMMUNITY GAME WITH PLAYER-CONFIGURABLE PARAMETERS

RELATED APPLICATIONS

This application claims the priority benefit of U.S. Provisional Application Ser. No. 61/600,261 filed Feb. 17, 2012 and U.S. Provisional Application Ser. No. 61/600,253 filed Feb. 17, 2012.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2013, WMS Gaming, Inc.

FIELD

Embodiments of the inventive subject matter relate generally to wagering game systems, and more particularly to wagering game systems including a community game with online and land-based wagering.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

BRIEF DESCRIPTION OF THE FIGURES

Embodiments of the invention are illustrated in the Figures of the accompanying drawings in which.

DESCRIPTION OF THE EMBODIMENTS

Figure 1:
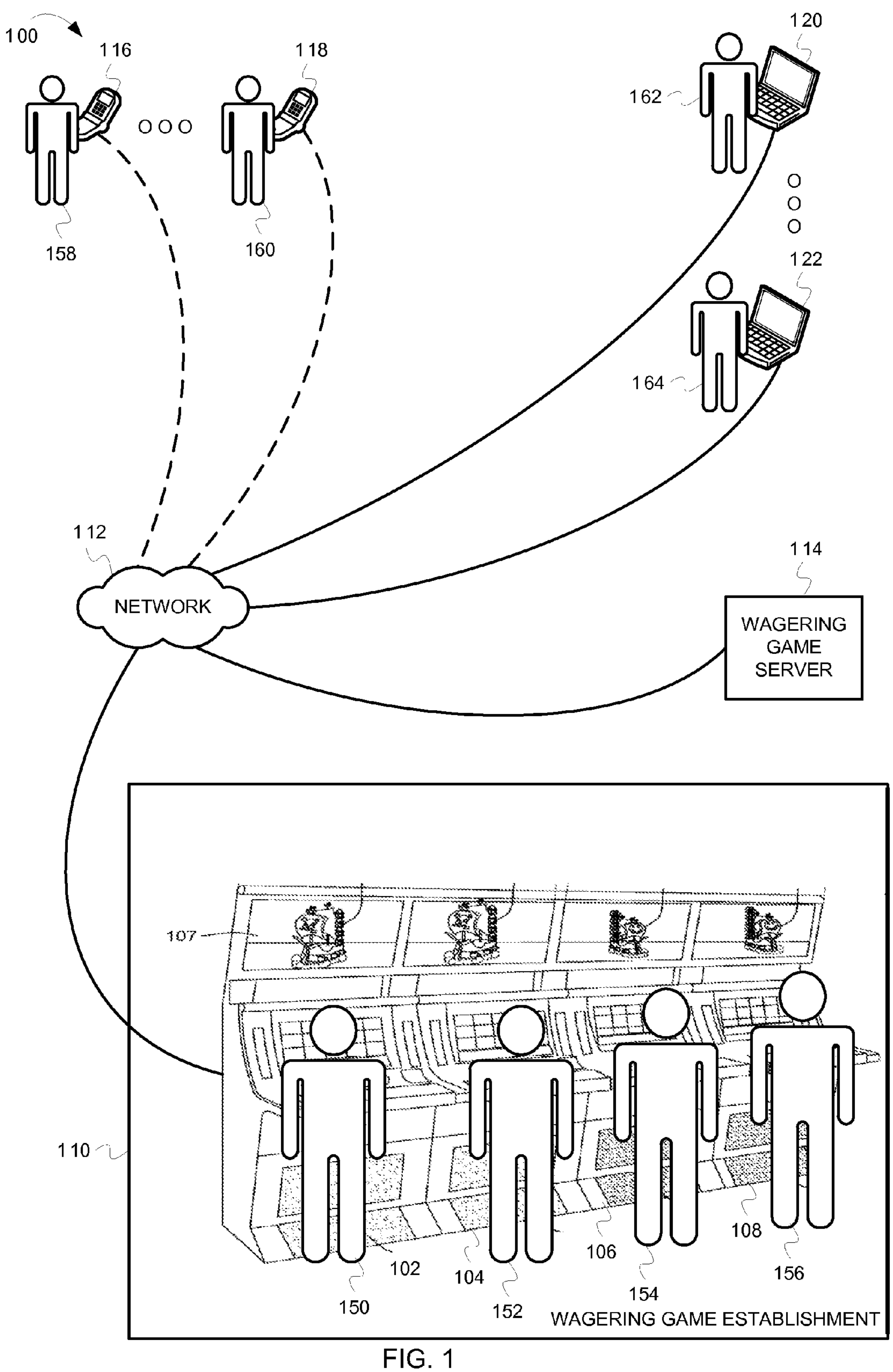
FIG. 1 depicts a system for providing a community game of a wagering game activity that includes both land-based game play and online game play, according to some example embodiments.

This description of the embodiments is divided into six sections. The first section provides an introduction to some example embodiments, while the second section provides a system environment. The third section describes some example embodiments for provide for variable parameters of a community game. The fourth section describes some example embodiments for online game play affecting a result in a community game for land-based game play (or vice versa). The fifth section describes a community game example. The sixth section describes an example operating environment. The seventh section describes an example wagering game machine and the eighth section presents some general comments.

Introduction

This section provides an introduction to some example embodiments. The examples herein are described in reference to a community game that includes both online game play and land-based game play. However, some example embodiments are applicable to any type of special event that is in response to playing a wagering game (e.g., individual bonus game play, community game for only online game play, community game for only land-based game play, etc.). Some example embodiments include a community game that includes both land-based game play and online game play. Land-based game play refers to gaming via electronic gaming machines within a brick-and-mortar gaming establishment, such as casinos. The online game play can include wagering on any type of device and over a network (e.g., Internet), wherein the device is not specifically tied to a wagering game establishment. Such device can be mobile or non-mobile. For example, a wagering game player can perform online game play from a desktop computer at their home, from their smartphone, etc. For example, a bank of wagering game machines at a wagering game establishment can be communicatively coupled to a server that provides online game play to players not necessarily at the wagering game establishment. The community game can provide for progressive bonuses; head-to-head wagering game play; etc. among wagering game players playing online and at land-based game play. In some example embodiments, the community game comprises at least one online wagering game player and at least one land-based wagering game player.

In some example embodiments, parameters for a community game are varied by wagering game players at least one of the land-based game play and online game play. For example, wagering game players playing the community game online can vary parameters for the game, while the wagering game players playing the same community game at a land-based wagering game machine (e.g., machines at a wagering game establishment) cannot vary these parameters.

In some example embodiments, the community game can be configured such that play by the online wagering game player can affect a result in a community game of the land-based wagering game player. The affecting of the community game can include any type of factoring or change of a random result within the community game. In some example embodiments, the affecting by the online game play is modifying a result of the community game for the land-based game play. For example, assume that the community game includes a picking game. The online players can make their selections (e.g., boxes). If the land-based player selects the selection that a predetermined number of the online players selected (e.g., majority), the land-based player is given a winning result of the picking game.

In another example, the online players can create a world for the community game based on their selections. For example, the online players can create objects that affect the physics of the game play of the community game. The land-based players can then play this community game to determine a result. In another example, the online game play can affect the land-based game play by replacing at least one Random Number Generator (RNG) result of the community game based on a result of some game played by the online game players. In some example embodiments, the online game play can affect the land-based game play by increasing or decreasing odds of a winning result based on a game played by the online wagering game players. For example, if the online wagering game players make the right selections in a picking game, their associated team members for land-based game play have increased odds of a winning result in the community game.

In some example embodiments, a result of the land-based gaming play (affected by the online gaming play) for the community game does not affect a result of the online gaming play. Alternatively, a result of the land-based gaming play (affected by the online gaming play) for the community game does affect a result of the online gaming play. For example, if the land-based gaming play has a winning result based on online gaming play from a group of online wagering game players, this group of online wagering game players are also awarded a winning result for the community game.

In some example embodiments, the online player can select a team among a number of teams in the land-based play. Accordingly, a result for a given team for the land-based game play of the community game is also the result for online players that selected that given team. In some example embodiments, the affecting of the community game is a change in the visual being presented (not necessarily affecting a result of the community game). For example, if the online player and the land-based player are on a same team, the online player can be visually represented on the display of the community game as being on the same team. For example, if the land-based player in the community game is represented as a pirate ship (see examples described below), the online player can be visually represented as a pirate on that ship on the display for the community game for the land-based play. Also, while described such that the online wagering game player can affect the land-based wagering game player, in some example embodiments, the land-based wagering game player can affect the online-wagering game player.

Also, the relationship between the land-based wagering game player and the online wagering game player can be one-to-one, one-to-N, or N-to-one. For example, the community game can include a bank of four land-based wagering game machines for four different land-based wagering game players. The community game can also comprise any number of online wagering game players. In some example embodiments, a land-based wagering game player and one to any number of online wagering game players can be on a same team.

System Environment

This section describes an example system environment for some example embodiments. The example system environment provides a community game that is part of a wagering activity that includes both land-based wagering and online game play. This example system environment can be used for providing variable parameters of the community game. This example system environment in an application, wherein the community game can be configured such that play by the online wagering game player can affect a result in the community game of the land-based wagering game player (or vice versa). While described separately, these two different applications can be combined. For example, variable parameters of the community game can be varied by the online game play (but not the land-based game play), and the online game play can affect a result of the community for the land-based game play.

FIG. 1 depicts a system for providing a community game of a wagering game activity that includes both land-based game play and online game play, according to some example embodiments. A system 100 includes a bank of wagering game machines (a wagering game machine 102, a wagering game machine 104, a wagering game machine 106, and a wagering game machine 108). The wagering game machines 102-108 are within a wagering game establishment 110 and provide land-based wagering. In this example, the wagering game machines 102-108 include a shared screen 107 that displays a community game being played at the wagering game machine 102-108. A land-based wagering game player 150 is playing the community game at the wagering game machine 102. A land-based wagering game player 152 is playing the community game at the wagering game machine 104. A land-based wagering game player 154 is playing the community game at the wagering game machine 106. A land-based wagering game player 156 is playing the community game at the wagering game machine 108.

The system 100 also includes online game play. In this example, an online wagering game player 162 is playing the community game using a computer 120. An online wagering game player 164 is playing the community game using a computer 122. An online wagering game player 158 is playing the community game using a mobile device 116. An online wagering game player 160 is playing the community game using a mobile device 118. As an example, the online wagering can be configured such that the online portion of the community game is hosted on a wagering game server 114. Accordingly, the mobile device 116, the mobile device 118, the computer 120, the computer 122, the wagering game server 114, and the wagering game machines are communicatively coupled together through a network 112. In some example embodiments, the land-based portion of community game can be hosted on the individual wagering game machines and/or at the wagering game server 114. The number of players for the land-based wagering can be limited by the number of wagering game machines at the wagering game establishment 110, while any number of players can be part of the online game play for the community game.

Also, as further described below, the land-based wagering game players and the online wagering game players can be part of a team. For example, there can be two teams across the four wagering game machines. The land-based wagering game player 150 playing on the wagering game machine 102 and the land-based wagering game player 152 playing on the wagering game machine 104 would be on a first team. The land-based wagering game player 154 playing on the wagering game machine 106 and the land-based wagering game player 156 playing on the wagering game machine 108 would be on a second team. Also, any number of online wagering game players can be associated with one of the land-based wagering game players.

Figure 2:
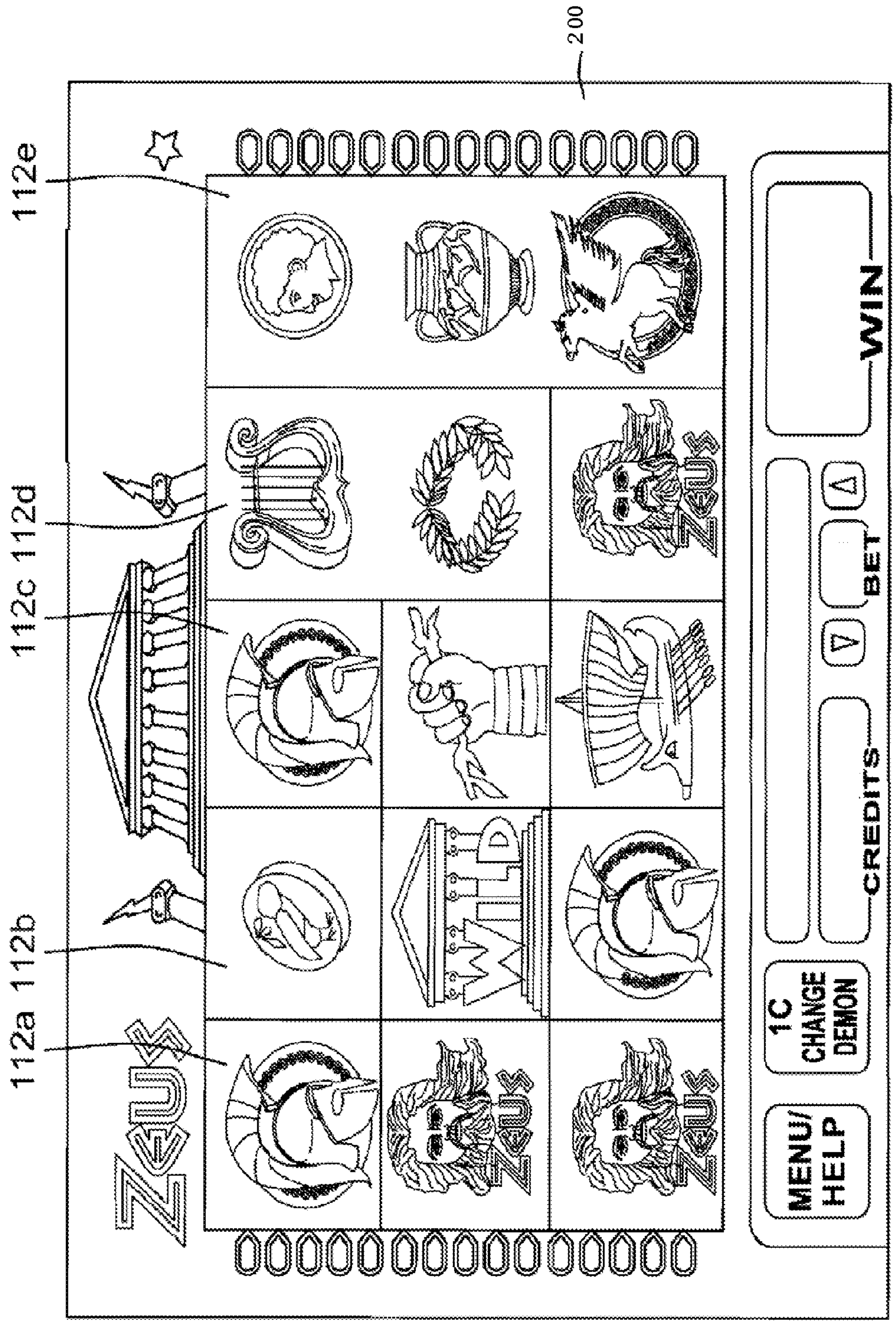
FIG. 2 depicts a game play screen presented to a land-based wagering game player, according to some example embodiments.
Figure 3:
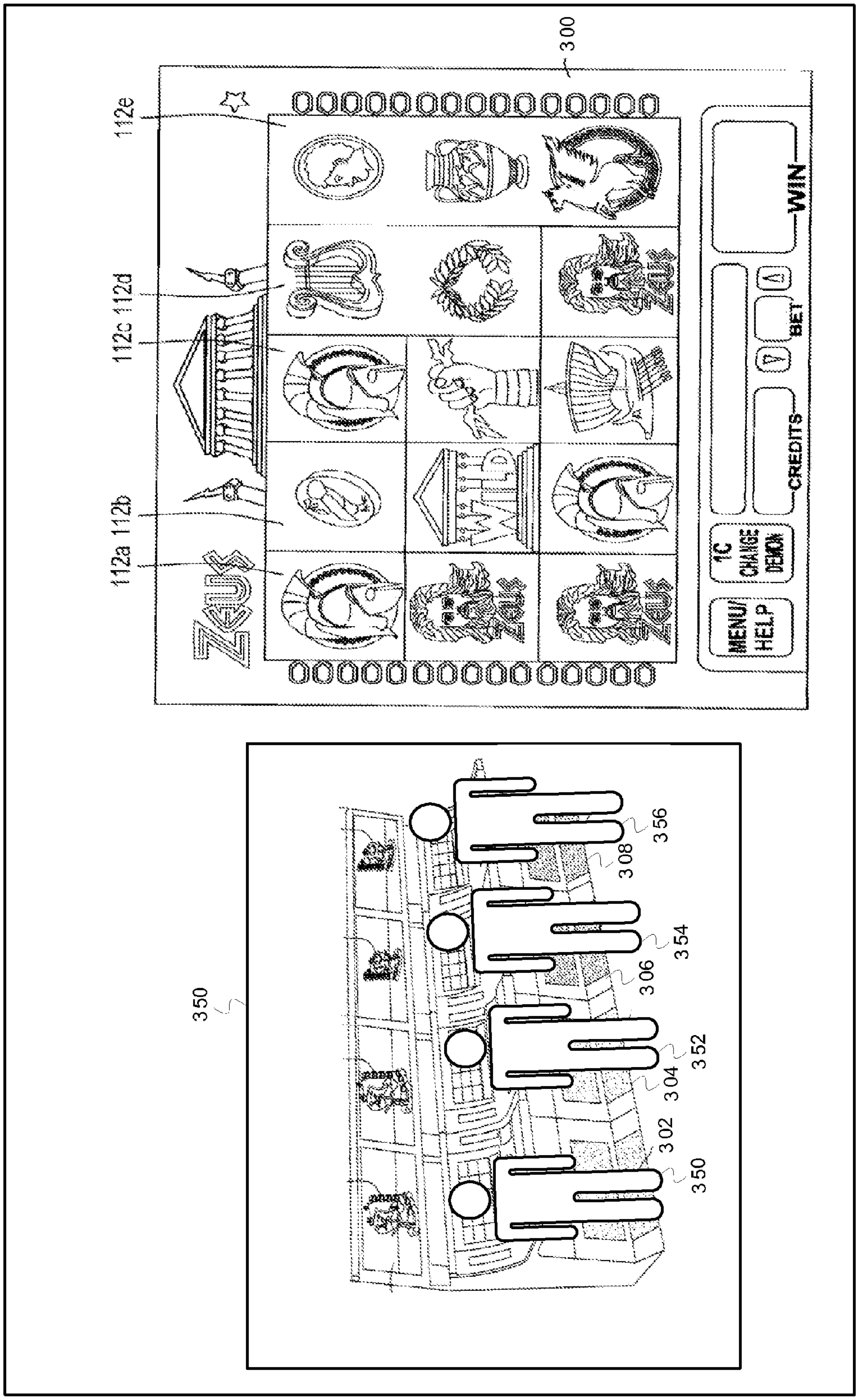
FIG. 3 depicts a game play screen presented to an online wagering game player, according to some example embodiments.

Also, the displays seen by the land-based wagering game player and the online wagering game player can be different. To illustrate, FIGS. 2-3 depict example displays provided to the land-based wagering game player and the online wagering game player, respectively. As further described below, other example displays provided to the land-based wagering game player and the online wagering game player are provided in subsequent Figures for specific applications. FIG. 2 depicts a game play screen presented to a land-based wagering game player, according to some example embodiments. In particular, FIG. 2 depicts a game play screen 200 that portrays a number of movable reels 112*a*-112*e* that represent the reels for basic game play. As further described below, a separate screen or screens can display a community game for the game play.

FIG. 3 depicts a game play screen presented to an online wagering game player, according to some example embodiments. In contrast to FIG. 2, FIG. 3 includes a view of the bank of wagering game machines that includes the land-based wagering game players. In particular, FIG. 3 depicts a game play screen 300 that portrays a number of movable reels 112*a*-112*e* that represent the reels for basic game play. As further described below, a separate screen or screens can display a community game for the game play. Additionally, the game play screen 300 for the online wagering game player includes a section 350 that provides a video of the actual game play of the land-based wagering game players for the same community game. Accordingly, the online wagering game players can view the reactions and activity of the land-based wagering game players. In this view, the online wagering game player can see all of the land-based wagering game players. In some other example embodiments, the online wagering game player is only given a view of the land-based wagering game player that is considered a team member. Additionally data can be presented to the game play screens depend on the application as illustrated in subsequent Figures herein.

Two different applications of a community game having land-based wagering game players and online wagering game players are now described. The first application enables players to vary parameters of the community game. The second application provides for online game play to affect a result in a community game for the land-based game play (or vice versa). These two applications can be practiced together or separately.

Variable Parameters of a Community Game

This section provides a description of a community game that includes both land-based game play and online game play, wherein parameters for the community game can be varied by wagering game players for at least one of the land-based game play and online game play. In some example embodiments, at least one of (but not both) the land based game play and the online game play can vary the parameters. For example, wagering game players playing the community game online can vary parameters, while the wagering game players playing the same community game at a land-based wagering game machine (e.g., machines at a wagering game establishment) cannot vary such parameters. Also, the examples in this section are illustrated for a community game that includes both online game play and land-based game play. However, some example embodiments are applicable to any type of special event that is in response to playing a wagering game (e.g., individual bonus game play, community game for only online game play, community game for only land-based game play, etc.). This section will discuss FIGS. 4-14.

Figure 4:
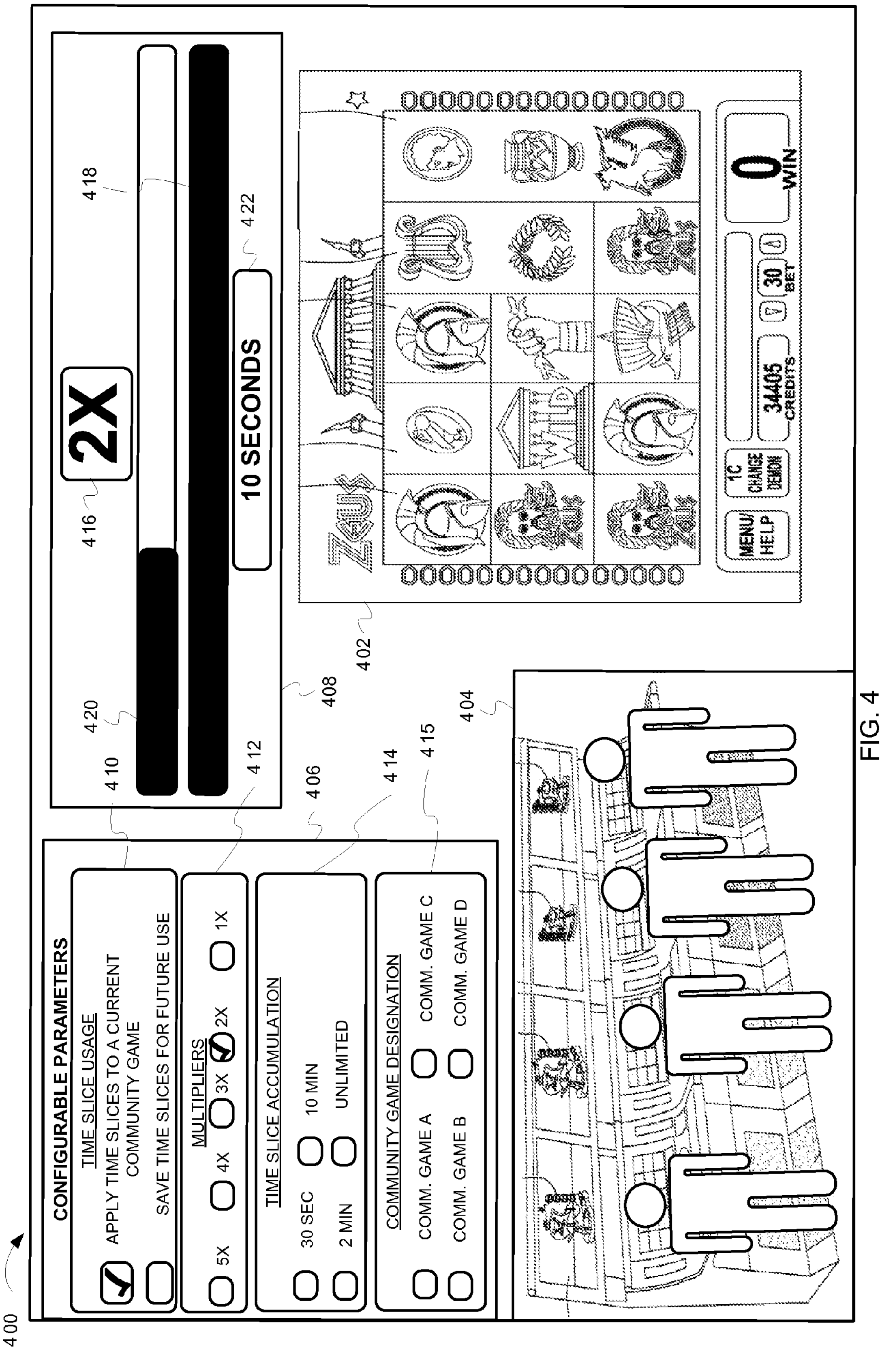
FIG. 4 depicts a game play screen presented to wagering game players that enable the wagering game players to vary parameters of a community game, according to some example embodiments.

FIG. 4 depicts a game play screen presented to wagering game players that enables the wagering game players to vary parameters of a community game, according to some example embodiments. In some example embodiments, this game play screen is presented to at least one of the online wagering game players or the land-based wagering game players. The group of wagering game players not presented with this game play screen to vary the parameters for the community game can be presented with the game play screens depicted in FIGS. 2-3 (described above). FIG. 4 depicts a game play screen 400 that includes a section 402 that portrays a number of movable reels that represent the reels for basic game play. As further described below, a separate screen or screens can display a community game for the game play.

Additionally, the game play screen 400 includes a section 404 that provides a video of the actual game play of the other group of wagering game players. For example, if this game play screen is being presented to the online wagering game players, the online wagering game players can view the reactions and activity of the land-based wagering game players that are shown in the section 404.

The game play screen 400 includes a section 406 that allows the wagering game player to configure parameters of the community game. In this example, there are four configurable parameters—timing of bonus usage, size of bonus multipliers, size of bonus time slice, and community game designation. A subsection 410 provides player inputs to allow the wagering game player to vary the timing of the bonus usage. A subsection 412 provides player inputs to allow the wagering game player to vary the size of the bonus multiplier. A subsection 414 provides player inputs to allow the wagering game player to vary the bonus time slice accumulation. In this example, the parameters that can be varied by the wagering game player are specific to the community game. A subsection 415 provides player inputs to allow the wagering game player to designate which community game to apply the time slices to for configurations where multiple community games are active.

Figure 5:
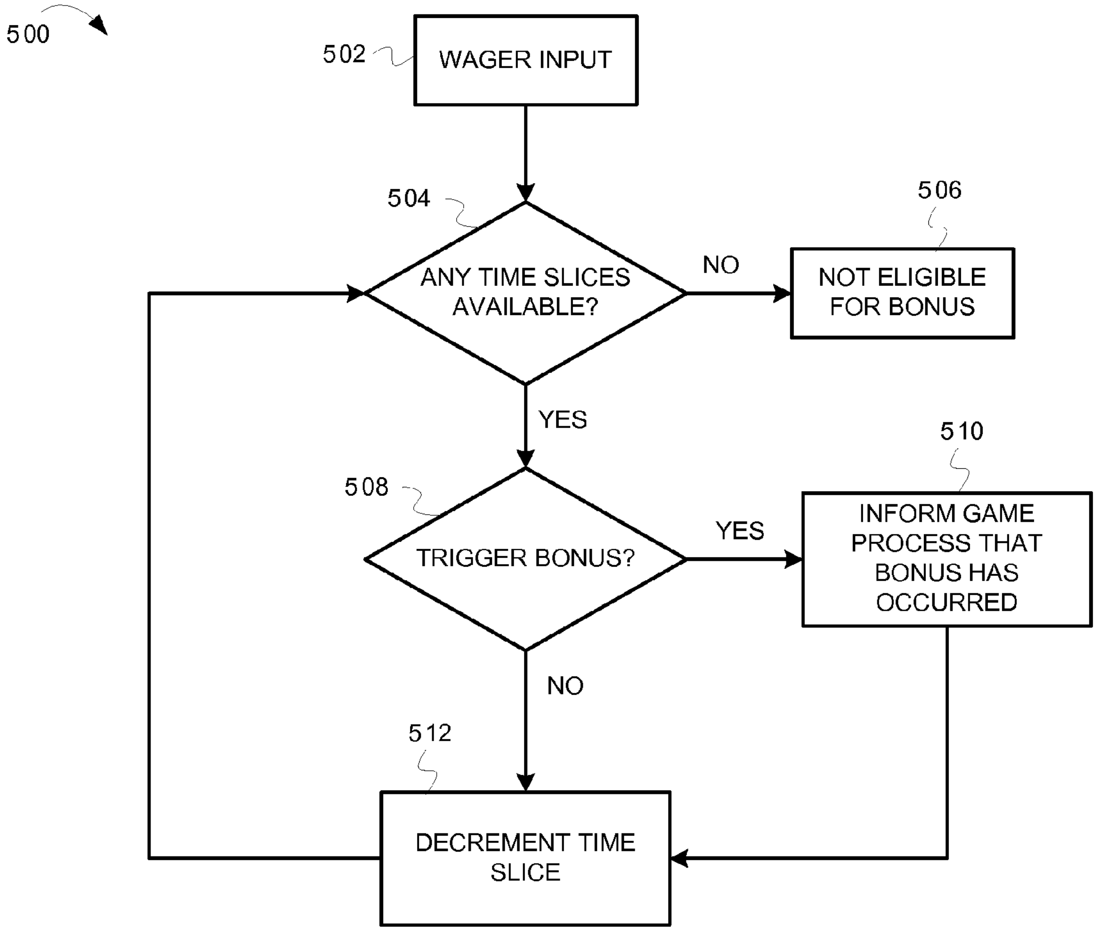
FIG. 5 depicts a flowchart for operations for playing a community game based on time eligibility of a wagering game player, according to some example embodiments.

To better illustrate how these parameters that can be varied, FIG. 5 is now described. In particular, FIG. 5 depicts a flowchart for operations for playing a community game based on time eligibility of a wagering game player, according to some example embodiments. Time eligibility is measured using a time slice, which is the amount of time that a wagered amount gives eligibility to the player for entry into the community game. A time-slice counter is used to increment and/or decrement time slices for increasing and/or decreasing the time that the player is eligible to enter the community game. In particular, if the player is eligible (based on the time slices) when a community game is triggered, the player is allowed to enter the community game. During each increment of time, an RNG determines whether the community game is triggered. If the player has eligibility during that increment of time, then the player is allowed to play the community game.

At block 502, a wager input is received from the player. Then, at block 504, a determination is made whether any time slices are available, i.e., whether the player is eligible for playing the community game. If the wagering game player does not have any time slices available, then, at block 506, it is determined that the wagering game player is not eligible for playing the community game. If the wagering game player has at least one time slice available, then, at block 508, a determination is made whether the community game should be triggered.

If the community game is triggered, then, at block 510, the game process is informed that the community game has occurred. At block 512, a time slice is decremented from the time-slice counter regardless of whether the community game has been triggered. Then, the operations go back to block 504 to determine whether there are any time slices available.

A bonus multiplier, which is a function of the amount wagered with respect to time, is applied to base amounts awarded in the community game. For example, a slot base game includes 20 paylines. The wagering game player makes a wager of 20 credits, wherein a spin of the slot reels covers all 20 paylines at 1 credit bet per payline. For the wagering game player to receive a 1× bonus multiplier for 5 seconds, each time slice must be 250 milliseconds ("ms.") long, as shown in Equation 1.

$$\text{Time Slice}=5\text{ seconds}/20\text{ credits bet}=250\text{ ms} \qquad \text{(EQUATION 1)}$$

In the above example, each credit buys 1 time slice of eligibility for the community game. Further, at every time slice interval (i.e., every 250 ms.) two things occur: i) a decision is made to determine if a time-based community game should be triggered, and ii) the number of time slices that the player has accumulated is updated, e.g., decremented.

A time-based community game is triggered, or awarded, at random and/or when a predetermined condition is met. In general, time-based community games are triggered asynchronously from base game flow. An asynchronous process can execute the RNG to select a random number at some predefined time interval. This random number is then compared to a predefined number or series of predefined numbers. If the random number matches, or is a subset of the predefined series, a community game should be triggered. If the random number does not match, or is not a subset of the predefined series, then no community game is triggered. The time interval of how often a number is selected, what range the number is selected from, and the criteria for matching to trigger a community game are all dependent on the desired mathematics of the game.

For example, if the time-based community game is to take up to 10% of the total return in the wagering game, then each time slice should have an Expected Value ("EV") of 0.1 credits, as shown in Equation 2. It is assumed that the time slices are purchased for 1 credit.

$$10\%\text{ of 1 credit}=0.1\text{ credits} \qquad \text{(EQUATION 2)}$$

In addition, the EV of each time slice is as follows:

$$\text{EV of a time slice}=(\text{Chance of the community game})\times(\text{EV of the community game}) \qquad \text{(EQUATION 3)}$$

For example, if a community game pays at an EV of 200 credits, then $$0.1\text{ credits}=(\text{Chance of the community game})\times(200\text{ credits}) \qquad \text{(EQUATION 4)}$$

Therefore, $$\text{Chance of the community game}=1/2{,}000\text{ each time slice} \qquad \text{(EQUATION 5)}$$

This means that on average one community game would occur every 2,000 time slices. For 250 ms time slices, on average the community game would occur every 500 seconds, or every 8.3 minutes. As explained in more detail below, the process that triggers the time-based community game can be executed locally, in another gaming machine, or on a server.

When the player presses a play button, e.g., a spin button on the player input device 24, time slices are purchased. The player can purchase enough time slices to qualify him or her for an enhanced multiplier, as discussed below. At every time slice interval, a process executes to remove one of the time slices. Optionally, more than one time slice can be removed when considering multipliers greater than 1×, as described in more detail below. The removal of the time slices continues until all of the player's time slices are removed. When all the time slices have been removed, the player becomes ineligible for playing the community game. In the above example, a total bet of 20 credits is made. The bet buys twenty 250 ms time slices, or 5 seconds of bonus eligibility. Every time slice of 250 ms is removed until no more time slices remain.

In the above examples, only a 1× multiplier has been discussed. However, higher bonus multipliers can be awarded for at least two reasons. First, as the player wagers more per game (i.e., multiple credits per payline), then the bonus awards should also increase. Second, if only 1× multipliers are awarded, then only the length of time eligibility continues to grow as the player's total wager amount increases (e.g., higher bet per line or faster play). For example, it is assumed that a first player has 10 minutes of time eligibility when a community game occurs, and a second player has 1 minute of time eligibility when the community game occurs. If only 1× multipliers are awarded, then both players will receive the same increase in their base awards. Thus, to further award the first player for having more eligibility time, a higher bonus multiplier is awarded.

Each multiplier level has a certain maximum number of purchasable time slices. After a wager fills an amount of time that has been designated to a specific multiplier level, the next level begins to fill. For example, the 1× multiplier level may have time slices purchased up to 30 seconds into the future. Any bet that exceeds the maximum number of allowed time slices for the 1× multiplier level begins to fill a 2× multiplier level. After the 2× multiplier level is filled, a 3× multiplier level begins to fill, and so on.

Returning to the description of the game play screen of FIG. 4, the wagering game player can vary some of the parameters associated with the community game. First, the wagering game player can determine whether they want to apply their accumulated time slices to a current community game or to save the time slices for use in a future community game. The subsection 410 displays the player inputs to allow for this configurable parameter.

Second, the wagering game player can vary the size of the bonus multipliers that are awarded in the community game based on the amount wagered with respect to time (as described above). This is shown in subsection 412 of FIG. 4. For example, instead of starting at the 1× multiplier level, the wagering game player may start at any of the bonus multiplier levels (e.g., 2×, 3×, 4×, 5×, etc.). However, the higher the bonus multiplier level is set, the smaller the size of the time slice that awarded. For example, assume the wagering game player sets the bonus multiplier level at 1× and makes a wager of 20 credits for a spin of the slot reels. In such an example, the wagering game player would receive a 1× bonus multiplier for 5 seconds (each time slice is 250 ms as shown in Equation 1 above). In another example, assume the wagering game player sets the bonus multiplier level at 5× and makes a wager of 20 credits for a spin of the slot reels. In such an example, the wagering game player may only receive a 5× bonus multiplier for 1 second (instead of 5 seconds for a 1× bonus multiplier). In such a configuration, time slices are held in reserve until enough are accumulated to trigger the player-selected multiplier. Accordingly, the player can set the desired value of the multiplier value such that the time value for event eligibility increases when the desired multiplier value is reached.

Third, the wagering game player can vary the bonus time slice accumulation. This is shown in subsection 414 of FIG. 4. For game play where the bonus parameters cannot be varied, a maximum bonus time is set (e.g., 30 seconds). Such a setting might be made so that the wagering game player with no credits is occupying a wagering game machine while waiting for the community game to trigger based on a large amount of time slices accumulated. For online game play, the occupation of a wagering game machine in a wagering game establishment is not an issue. Accordingly, online wagering game players can accumulate an unlimited number of time slices without affecting other wagering game players' ability to play. In the example of FIG. 4 (the subsection 414), the wagering game player has four options for the amount of bonus time slice accumulation—1) 30 seconds, 2) 2 minutes, 3) 10 minutes, and 4) unlimited. In contrast to this variable accumulation, a wagering game player that cannot vary the accumulation is required to advance to a next multiplier level after exceeding the maximum time. A more detailed description of this advancement is set forth below.

Fourth, the wagering game player can vary which of the one or more community games to apply the eligibility there to. This is shown in the subsection 415 of FIG. 4. In particular in some example embodiments, there can be more than one community game that is active. In the example of FIG. 4 (the subsection 415), the wagering game player has four options for community games to which the eligibility can be applied—1) community game A, 2) community game B, 3) community game C, and 4) community game D. In some example embodiments, the player can not only designated multiple community games but also percentages of application of the eligibility. For example, the player can select two different community games, wherein the percentage of application is 60% and 40%. In such an example, if a player is awarded 10 seconds eligibility (based on their base game activity), six seconds of eligibility is applied to the first community game and four seconds of eligibility is applied to the second community game.

The game play screen 400 of FIG. 4 also includes a section 408. The section 408 provides an eligibility indicator for the community game. The section 408 includes a first eligibility bar 418 and a second eligibility bar 420. The eligibility bars can be associated with different multiplier levels (as further described below). Accordingly, the number of eligibility bars can equal the number of bonus multiplier levels. If the player's first eligibility bar 418 is full when the player makes a bet, then the second eligibility bar 420 appears as an additional bar, on top of the first eligibility bar 418. As shown, the player has 10 seconds of eligibility at a 2× multiplier, which is shown in a multiplier indicator 416 and a time indicator 422, and 35 seconds of eligibility at a 1× multiplier. Thus, the player has a total of 45 seconds of bonus-time eligibility. The time indicator 422 shows the player, numerically, how much time of bonus eligibility they currently have, e.g., 10 seconds, at the current multiplier level. The eligibility bars 418-420 represent the percentage of eligibility that has been filled for the current multiplier level.

The number shown in the multiplier indicator 416 is the current multiplier. As shown, the current multiplier is 2×. Thus, the player is aware that they are eligible for 10 seconds for entry into the time-based community game, wherein, if the community game is triggered, any awards won during the community game will have a 2× multiplier. Further, the player is aware that the 1× multiplier level is only filled to about 25% of its capacity, wherein the full capacity of the 1× multiplier level is reached at about 30 seconds. If no time is left and the community game is triggered, the player is not eligible to play the community game.

Figure 6:
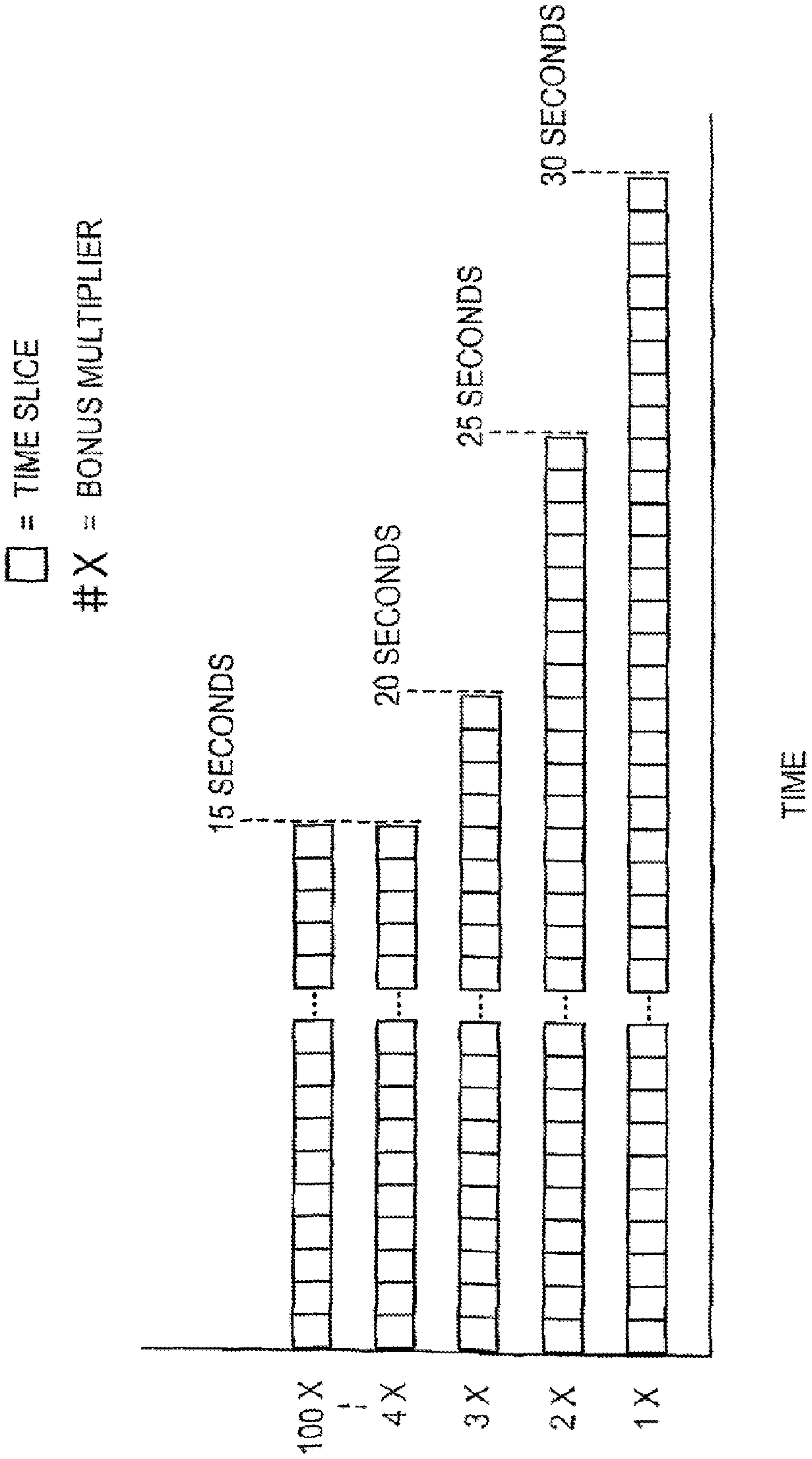
FIG. 6 depicts a chart of the bonus multipliers relative to time slices for the community game, according to some example embodiments.

FIGS. 6-13 are now described and which illustrate the awarding of bonus time slices in accordance with the standard approach that cannot be varied by the wagering game player. FIG. 6 depicts a chart of the bonus multipliers relative to time slices for the community game, according to some example embodiments. In particular, FIG. 6 shows how higher bonus multipliers are awarded to a player that is eligible for the time-based community game. At the 1× multiplier level, time slices can be purchased up to 30 seconds. If additional time slices are purchased, then the 2× multiplier begins to fill until the entire level is full, i.e., until all 25 seconds that are allocated to the 2× multiplier level have been filled with time slices. Then, the 3× multiplier level fills until all 20 seconds have been filled.

At some multiplier, and above, the time up to which time slices can be purchased will stop getting shorter. For example, for multipliers 4×-100×, the allocated time of each level is 15 seconds.

When a time-based community game is triggered, the player's current maximum multipliers for which they are qualified multiplies all awards in the community game. In theory, the player could qualify for an infinite multiplier value. However, in practice a maximum cap can be applied to the multiplier values. For example, the maximum multiplier value can be 100×. The cap can be accomplished, for example, by a combination of limiting the speed of play and/or disabling wagering when the maximum value is reached.

Figure 7:
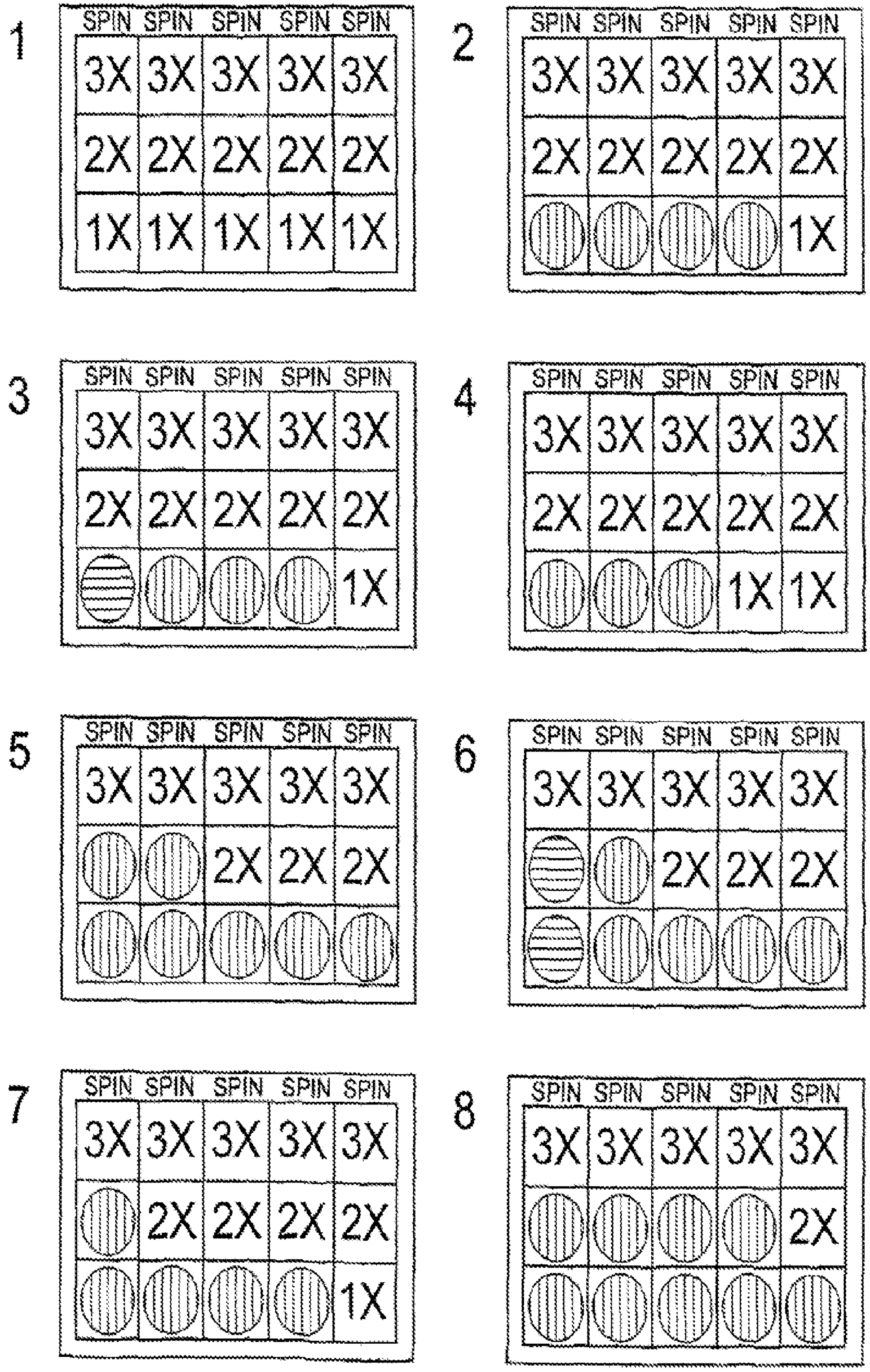
FIG. 7 depicts snapshots regarding how time slices are incremented and decremented from different bonus multiplier levels, according to some example embodiments.

FIG. 7 depicts snapshots regarding how time slices are incremented and decremented from different bonus multiplier levels, according to some example embodiments. In particular, FIG. 7 shows 8 snapshots regarding how time slices are incremented and decremented from a plurality of multiplier levels. It is assumed that each column represents a time slice of eligibility for spinning a plurality of reels during a community game. Further, each row represents one of three multiplier levels, 1×, 2×, and 3×, each multiplier level having a maximum of 5 time slices (or eligible spins).

In snapshot 1, the player has no time slices available, wherein the player has just started playing or is playing slowly. Thus, the player is not eligible for playing a time-based community game. In snapshot 2, the player has purchased 4 time slices, which are represented as vertically-hatched circles in the first four columns of the 1× multiplier level. When the player is not wagering, time slices are removed from the first column from each of the eligible multiplier levels. Thus, snapshot 3 shows a vanishing time slice, which is depicted as a horizontally-hatched circle, in the first column of the 1× multiplier level. As shown in snapshot 4, remaining eligibility time slices slide over after the time slice has been removed from the first column of the 1× multiplier level.

As the player continues to play, additional eligibility time slices will generally fill a full set of the 1× multiplier level and begin to fill the 2× multiplier level. In snapshot 5, the player has purchased five additional time slices. The first three time slices fill the 1× multiplier level, from left to right, and the last two time slices fill the first two positions of the 2× multiplier level. Thus, the player is now eligible for receiving a 2× multiplier for any awards won during the time-based community game.

In snapshot 6, the player is using the leftmost time slice of the 1× multiplier level and the leftmost time slice of the 2× multiplier level, both of which are shown as horizontally-hatched circles. Time slices are used, for example, during a base game of the wagering game.

According to some example embodiments, time slices are suspended during the time-based community game. For example, when the time-based bonus occurs the time slices are not incremented/decremented, e.g., an eligibility clock stops ticking. Then, when the player resumes normal play, such as when returning to the base game, the time slices resume the process of incrementing/decrementing, e.g., the eligibility clock begins ticking again.

In snapshot 7 the leftmost circles shown in snapshot 6 have been removed and every other time slice has shifted by one column to the left. Thus, the player has now only one time slice available for the 2× multiplier, and three time slices available for the 1× multiplier. Then, in snapshot 8, the player has purchased four additional time slices. The first additional time slice fills the rightmost column of the 1× multiplier level, and the second-fourth additional time slices fill the second column-fourth column of the 2× multiplier level.

In snapshots 1-8 the time slices have been described to fill-in a first row (e.g., the bottom row), horizontally, before filling-in another row (e.g., a higher row). Alternatively, the time slices can fill-in a first column (e.g., a leftmost column), vertically, before filling-in another column (e.g., a central column). For example, referring to snapshot 2, instead of the four time slices filling-in the first four columns of the bottom row, the four time slices would fill-in the first column for each multiplier row (i.e., 3×, 2×, and 1×) and the second column for the top multiplier row (i.e., 3×).

In the horizontal fill-in method, a player wagering one credit per line could, for example, acquire 10 seconds of eligibility at the 1× multiplier. Under the vertical fill-in method, a player wagering five credits per line would still acquire only 10 seconds of eligibility, but the eligibility would be at a higher multiplier, e.g., at a 5× multiplier. Thus, instead of increasing the time of eligibility, the player would increase the bonus multiplier. One advantage of the vertical fill-in method is that the player tends to receive a bonus multiplier based on the wager per line (e.g., a 3× multiplier will be received for a three credits per line wager).

Additionally, wrapping of additional time slices also applies to the vertical fill-in method. Additional time slices are wrapped vertically to increase the bonus multiplier, when time slices at the player's current wager have already been filled to the maximum allowed time. For example, a player, which is currently at a 5× multiplier, that makes a wager of five credits per line, will increase the current multiplier level to a 10× multiplier if all of the allowed 5× multiplier time slices have been filled. Optionally, wrapping of additional time slices is only applied to a portion of the wager. For example, it is assumed that the player can add three seconds at the 5× multiplier level. A next wager of 5× may buy ten seconds of time slices that would generally be added to the 5× multiplier level. Because only three seconds can be filled at the 5× multiplier level, the remaining seven seconds are wrapped at the next multiplier level, e.g., at a 10× multiplier level. Thus, additional time slices are added vertically to increase the bonus multiplier, not horizontally to increase the eligibility time.

Figure 8:
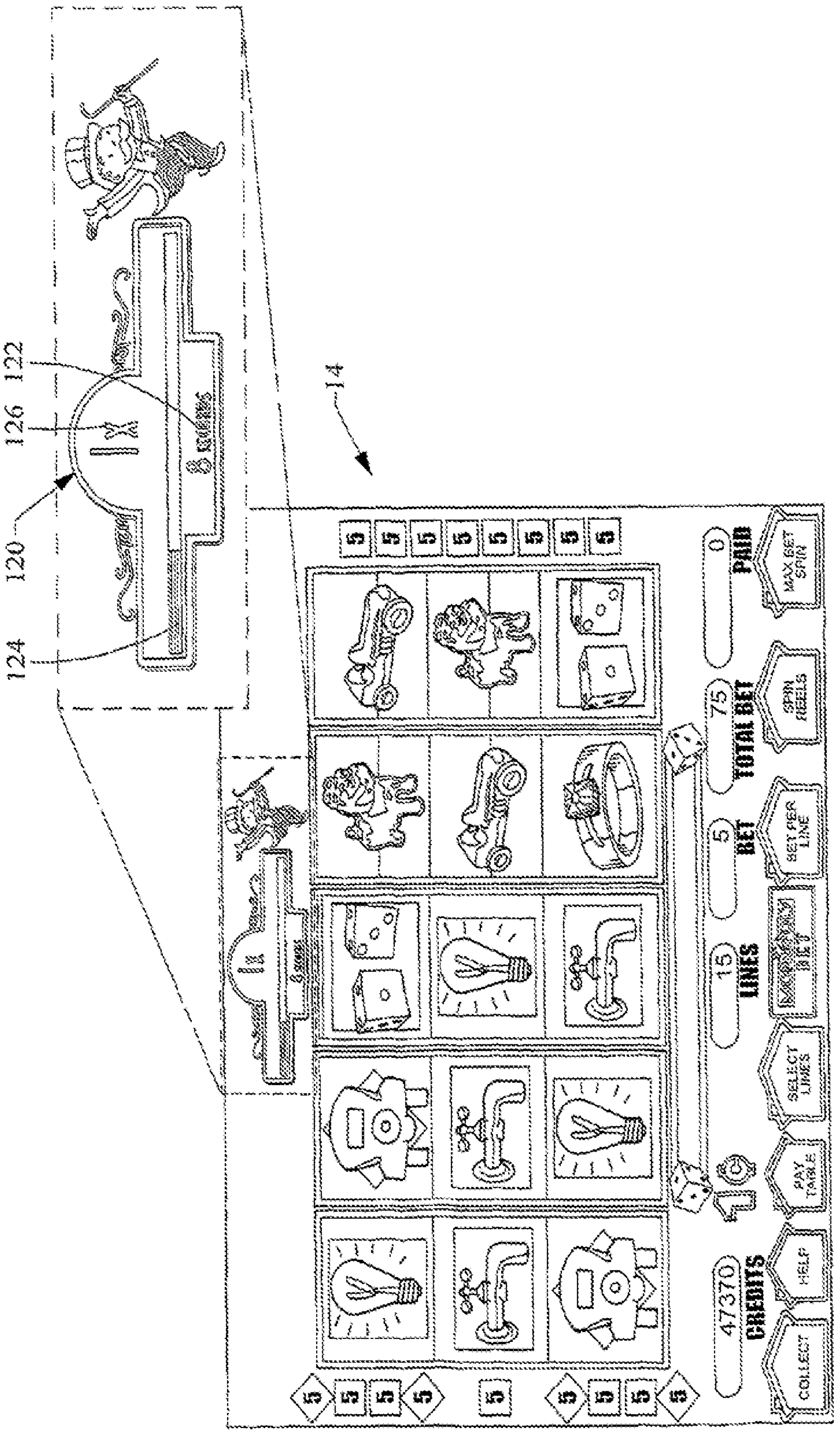
FIG. 8 depicts a primary display for a base game that illustrates a time slice eligibility for a community game, according to some example embodiments.

FIG. 8 depicts a primary display for a base game that illustrates a time slice eligibility for a community game, according to some example embodiments. In FIG. 8, a primary display 14 illustrates a time slice eligibility indicator 120 for communicating to the player the current level of time eligibility. The eligibility indicator 120 includes a time indicator 122, an eligibility bar 124, and a multiplier indicator 126. Like other aspects of the primary display 14, a wagering game module executing on a processor can control the eligibility indicator 120.

The eligibility indicator 120 is displayed above the reels, during a base game. The time indicator 122 shows the player, numerically, how much time of bonus eligibility he/she currently has, e.g., 8 seconds. The eligibility bar 124 represents the percentage of eligibility that has been filled for the current multiplier level. For example, the current bar is filled to approximately 25% of its capacity.

The number shown in the multiplier indicator 126 is the current multiplier. As shown, the current multiplier is 1×. Thus, the player is aware that they are eligible for entry into a time-based community game, wherein, if the community game is triggered, any awards won during the community game will have a 1× multiplier. Further, the player is aware that the 1× multiplier level is only filled to about 25% of its capacity, wherein the full capacity of the 1× multiplier level is reached at about 30 seconds. If no time is left and the community game is triggered, the player is not eligible to play the community game.

Figure 9:
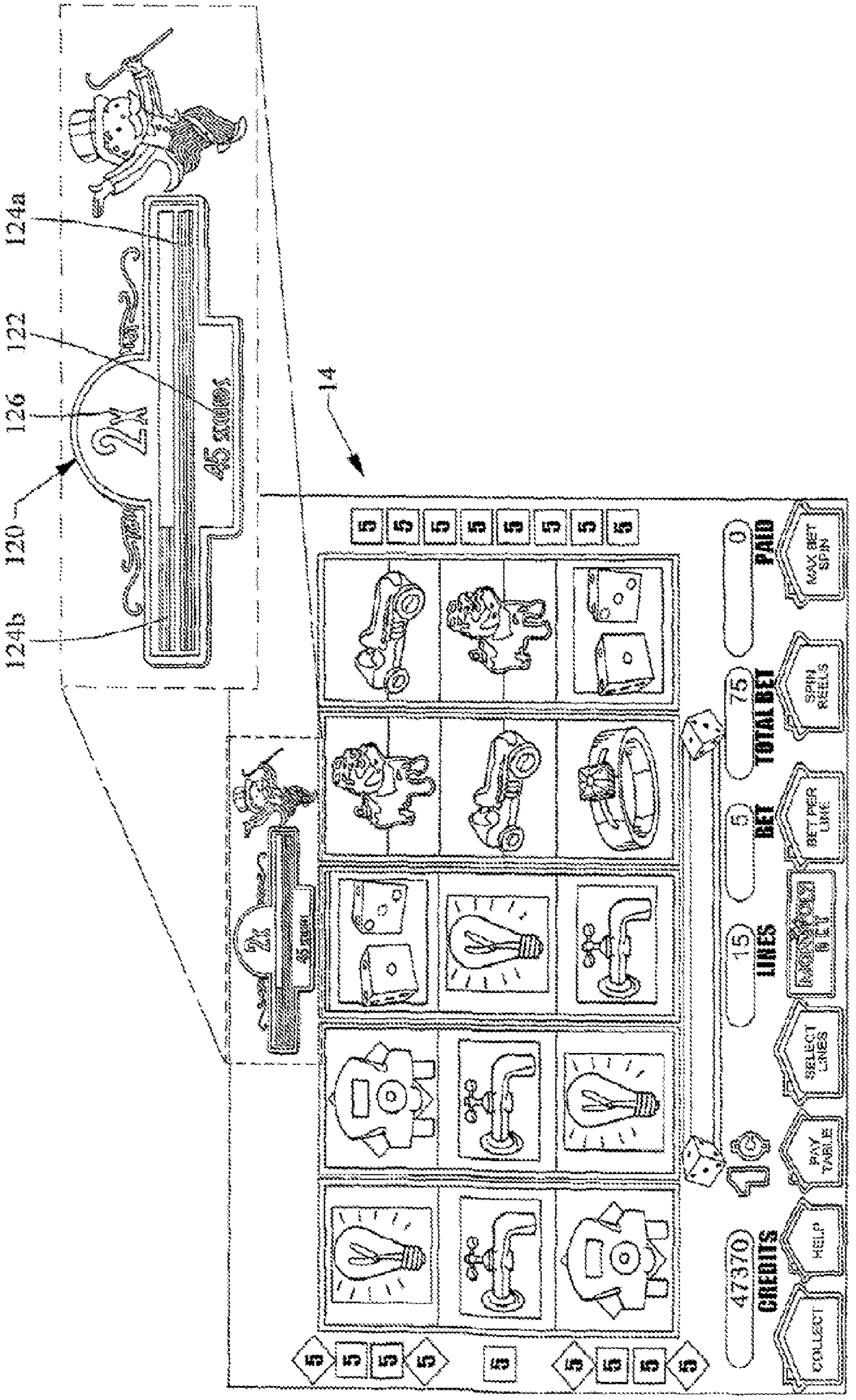
FIG. 9 depicts a primary display for a base game that illustrates a time slice eligibility for a community game, according to some other example embodiments.

FIG. 9 depicts a primary display for a base game that illustrates a time slice eligibility for a community game, according to some other example embodiments. In contrast to the primary display of FIG. 8, the primary display of FIG. 9 includes multiple eligibility bars for multiple bonus multiplier levels. In particular in FIG. 9, the eligibility indicator 120 now includes a first eligibility bar 124*a* and a second eligibility bar 124*b*. If the player's first eligibility bar 124*a* is full when the player makes a bet, then the second eligibility bar 124*b* appears as an additional bar, on top of the first eligibility bar 124*a*. As shown, the player has 10 seconds of eligibility at a 2× multiplier, which is shown in the multiplier indicator 126, and 35 seconds of eligibility at a 1× multiplier. Thus, the player has a total of 45 seconds of bonus-time eligibility. The addition of the second eligibility bar 124*b* is similar to the increase that takes place between snapshot 4 and snapshot 5 in FIG. 7.

In this embodiment, eligibility at a higher multiplier is used before eligibility at a lower multiplier. Alternatively, eligibility can be used in any order. For example, eligibility time between the 2× multiplier and the 1× multiplier can be alternated every 2 seconds, wherein the player will receive a 2× multiplier the first two seconds, a 1× multiplier the next two seconds, a 2× multiplier the following seconds, and so on.

Other graphical methods can be used to display time eligibility. For example, a time hand of a stopwatch can be used to indicate the percentage of time eligibility, such as the percentage shown in the eligibility bars 124*a*-124*b*. Other methods can include showing the accumulation of items related to a theme of the game. For example, if the game is a MONOPOLY™ game, then the time eligibility can be represented by accumulation of coins, houses, and/or hotels.

Several other methods can be used to calculate the percentage of time eligibility. For example, only the percentage of eligible time slices for the currently active multiplier can be shown. Because the eligibility time of the player may include overlapping incremented and decremented time, wherein the player may purchase and use eligibility time generally simultaneously, the bar of eligible time does not increase and/or decrease in a smooth manner.

Another method shows the eligible time slices as compared to all possible time slices. In this method, the bar of eligible time increases and/or decreases in a smooth manner. However, if a high multiplier is possible, such as 100×, then in practice only small portions of the time eligibility percentage would actually fill in.

An alternative method shows the percentage of eligible time slices as compared to some set number of time slices. For example, a sum of all eligible time slices is compared to 100 time slices. The bar of eligible time increases and/or decreases in a smooth manner. If at any time the number of eligible time slices is above the set number of time slices, the percentage can still be displayed at 100%.

When the RNG hits a number that triggers the time-based community game, the player's current game is interrupted and the player plays the time-based community game (if the player is eligible). Then, when the time-based community game ends, the player resumes the current game. For example, the player's current game can be a local base game, such as slots, or a local bonus game. The player is allowed to play the time-based community game using the highest bonus multiplier for which the player is available. Alternatively, the player is allowed to play the time-based bonus using any other bonus multiplier.

Figure 10:
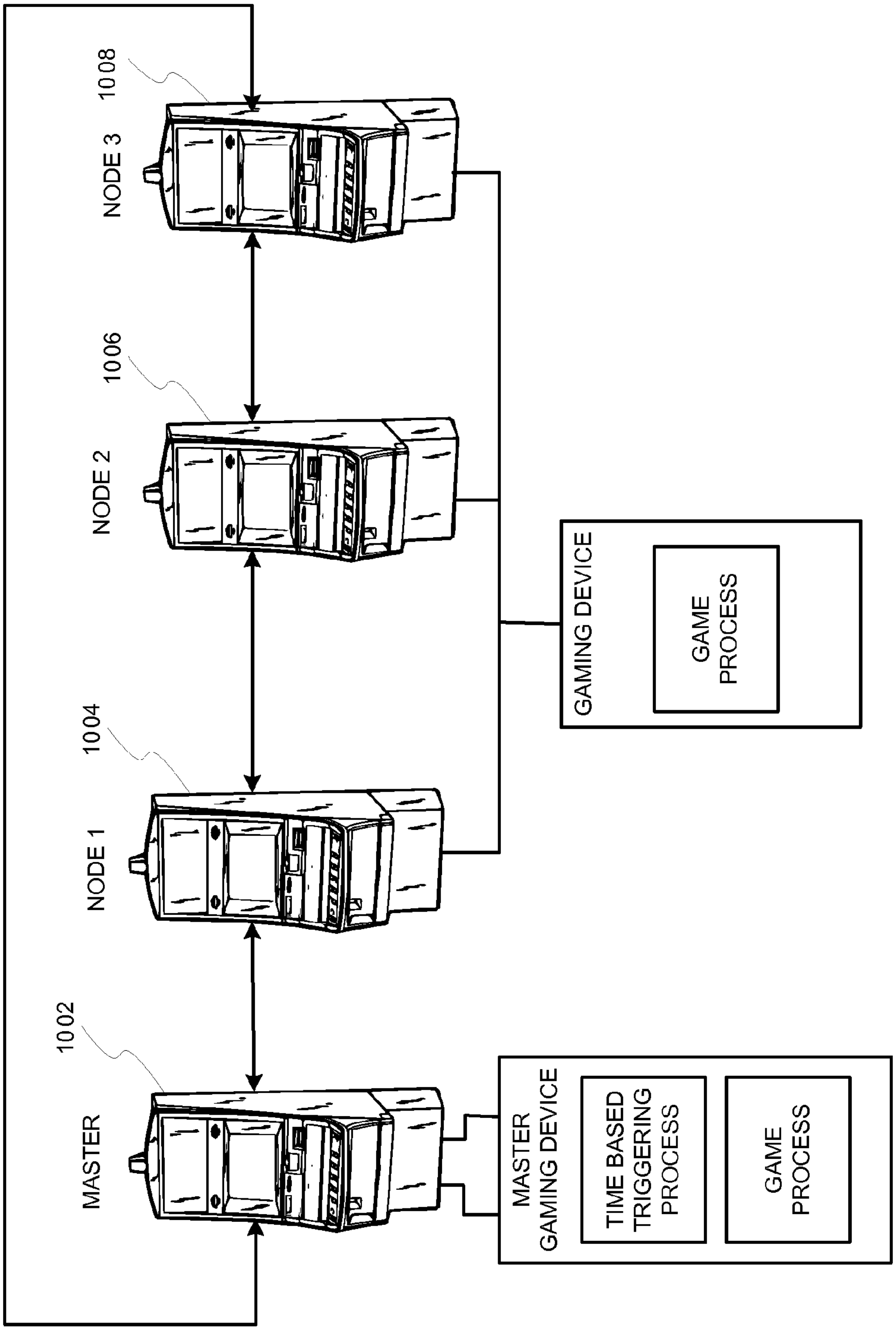
FIG. 10 depicts a number wagering game machines that provided land-based wagering having a community game, according to some example embodiments.

FIG. 10 depicts a number wagering game machines that provided land-based wagering for a community game, according to some example embodiments. Wagering game machines 1002, 1004, 1006, and 1008 are networked together for triggering a time-based community game, also referred to as a community bonus.

The wagering game machines include a master machine 1002 and a plurality of node machines 1004-1008. The master machine 1002 triggers the community bonus for all the wagering game machines 1002-1008, wherein all the wagering game machines 1002-1008 participate in the community bonus at the same time if they are eligible. Optionally, in addition to sharing the timing of the bonus trigger, the machines can share game outcomes and player decisions.

Each one of the wagering game machines 1002-1008 participates in the community bonus according to the time-based eligibility that each machine determines locally. The master machine 1002 continuously runs a process to determine if the community bonus should occur, using its RNG. For example, every 250 ms, the RNG in the master machine 1002 determines if the community bonus is triggered. If the master machine 1002 determines that the community bonus should occur, then it will issue an invitation to the node machines 210*b*-210*d*. Because each of the wagering game machines 1002-1008 keeps track of its own current eligibility, each of the wagering game machines 1002-1008 will make a decision whether it will allow the player to participate in the community bonus, and at which multiplier.

Alternatively, a separate community game server is used instead of the master machine 1002. Thus, for the purposes of triggering of the community game and sharing of outcomes, the master machine 1002 would be replaced with a community game server.

Figure 11:
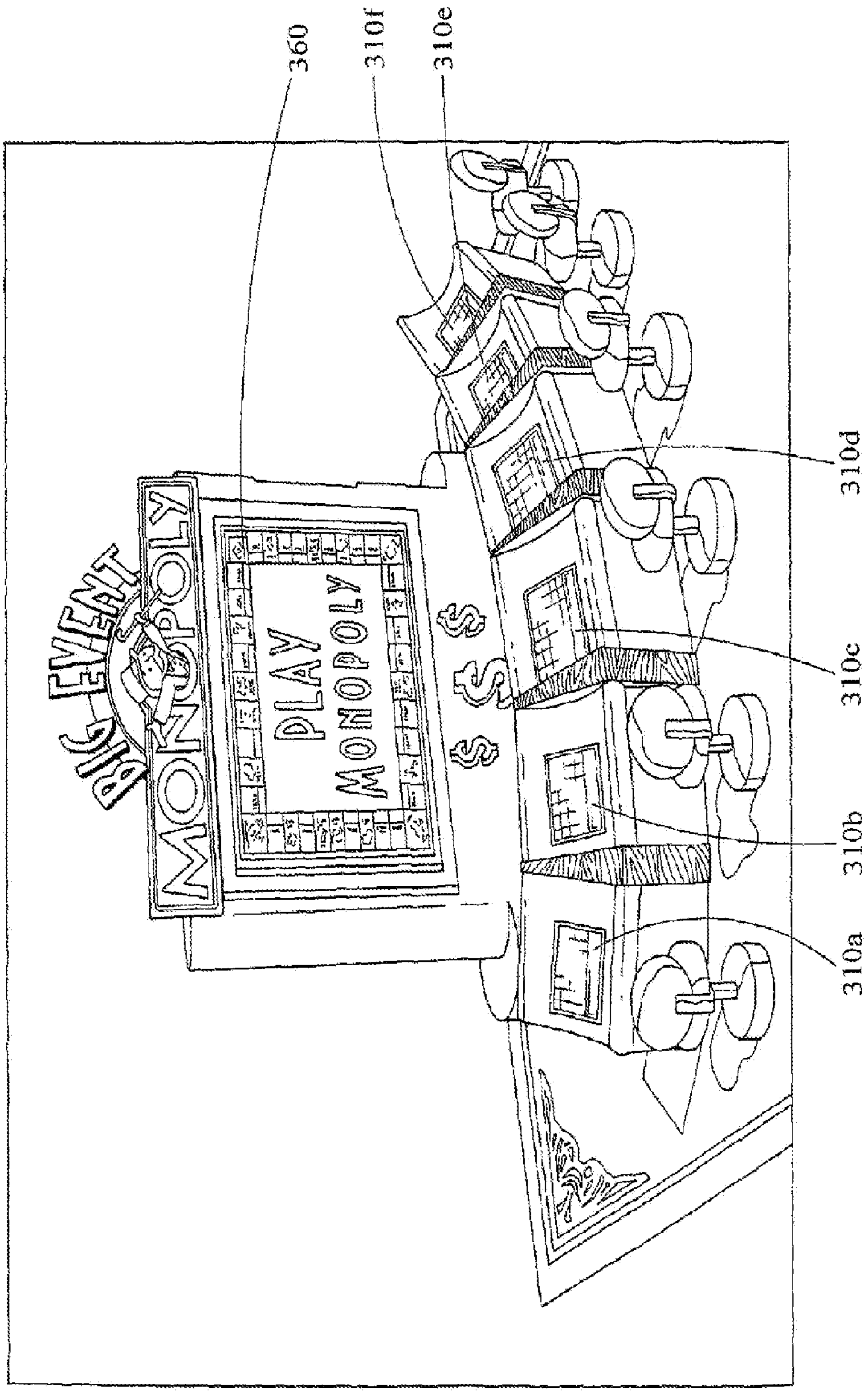
FIG. 11 depicts a number of wagering game machines and a central screen networked together for land-based wagering, according to some example embodiments.

FIG. 11 depicts a number of wagering game machines and a central screen networked together for land-based wagering, according to some example embodiments. In particular, FIG. 11 depicts wagering game machines 310*a*-310*f* and a central screen 360 that are networked together. The central screen 360 can include dual-sided plasma displays, a mechanical dice, and/or other devices designed to attract potential players to the gaming machines 310*a*-310*f*. Every played game can buy the player a time slice of eligibility in a BIG EVENT BONUS, i.e., a community game. When the BIG EVENT BONUS is triggered, all eligible players get to play in the community game.

Figure 12:
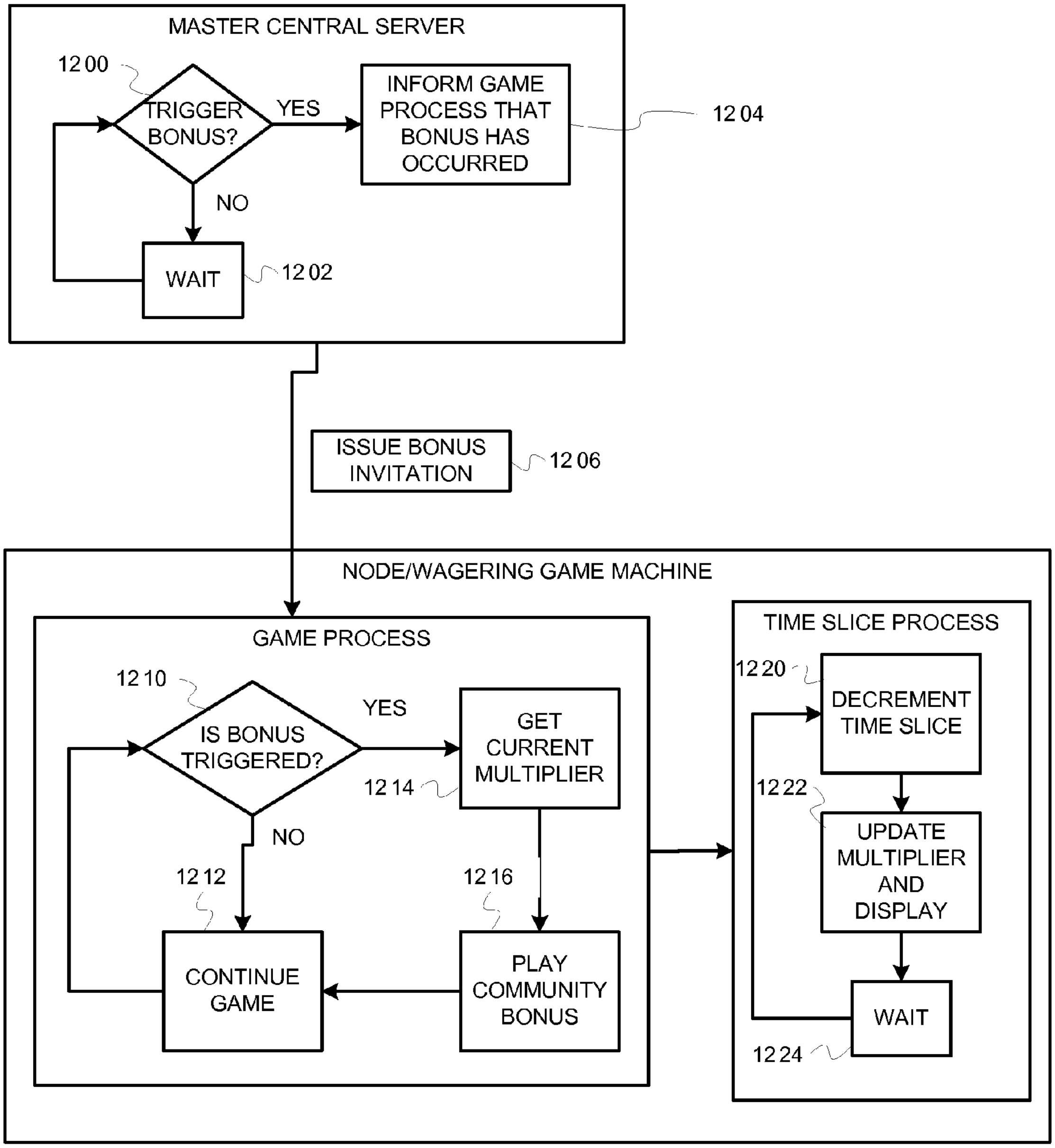
FIG. 12 depicts a flowchart of interactions between a master/central server and a node/wagering game machine during a time-based community game process, according to some example embodiments.

FIG. 12 depicts a flowchart of interactions between a master/central server and a node/wagering game machine during a time-based community game process, according to some example embodiments. In particular, FIG. 12 depicts a flowchart of interactions between a master/central server and at least one node/gaming machine 10, 210, or 310 during a time-based community game process. At block 1200, the master determines whether a community game should be triggered. If a community game is not triggered, then at block 1202 no action is taken. If a community game is triggered, then at block 1204 the master informs the game process that the community game has occurred. At block 1206 the master issues a community game invitation to all the networked gaming machines 10, 210, or 310.

At block 1210, during a game process, the gaming machine 10, 210, or 310 makes a determination whether the community game has been triggered, e.g., the gaming machine 10, 210, or 310 determines whether a community game invitation has been issued at block 1206. If a community game has not been triggered, then at block 1210 the gaming machine 10, 210, or 310 continues playing a local game. If the community game has been triggered, then at block 1214 the gaming machine 10, 210, or 310 obtains the current multiplier. If the gaming machine 10, 210, or 310 does not have any eligible time, then the multiplier is zero and the gaming machine 10, 210, or 310 cannot participate in the community game. Then, at block 1216, the gaming machine 10, 210, or 310 plays the community game until the community game ends. After the community game ends, the local game resumes at block 1210.

The community game invitation can be received by the gaming machine 10, 210, or 310 at any time. For example, the community game invitation for playing the community game can be received while a local bonus is already in progress. In this case, the gaming machine 10, 210, or 310 will play the community game to completion, and then the gaming machine 10, 210, or 310 will return to the local bonus at the point at which it was interrupted.

A time-slice process for the gaming machine 10, 210, or 310 continues generally simultaneously with the game process. At block 1220 a time slice of eligibility is decremented after an equivalent unit of real time progresses, e.g., a time slice of 250 ms. is decremented after 250 ms. of time has passed in real time. If the player continues to make wagers, then it is possible for the time slices to increment (e.g., if the player makes wagers at a higher rate than he/she is currently playing games), or to remain constant (e.g., if the player makes wagers at an equal rate to the rate that he/she is currently playing games). Then, at block 1222 a multiplier and/or display indicator are updated in function of the current eligibility. At block 1224 the gaming machine 10, 210, or 310 waits until it is necessary to update the eligibility time, e.g., decrement a time slice.

Because the community game can occur during other bonus events, the gaming machine 10, 210, or 310 continues to decrement time slices during any local bonus. To counteract any negative perception of losing bonus eligibility while playing a local bonus, part of the estimated value from the local bonus can be applied towards awarding additional time slices to the player. If the local bonus is played at a reasonable pace, the additional time slices will maintain the player's eligibility throughout the duration of the local bonus game. Optionally, the local bonus can be made a time-based bonus. Alternatively, all community games can be suspended when any game on the networked gaming machines 10, 210, or 310 triggers a local bonus.

Figure 13:
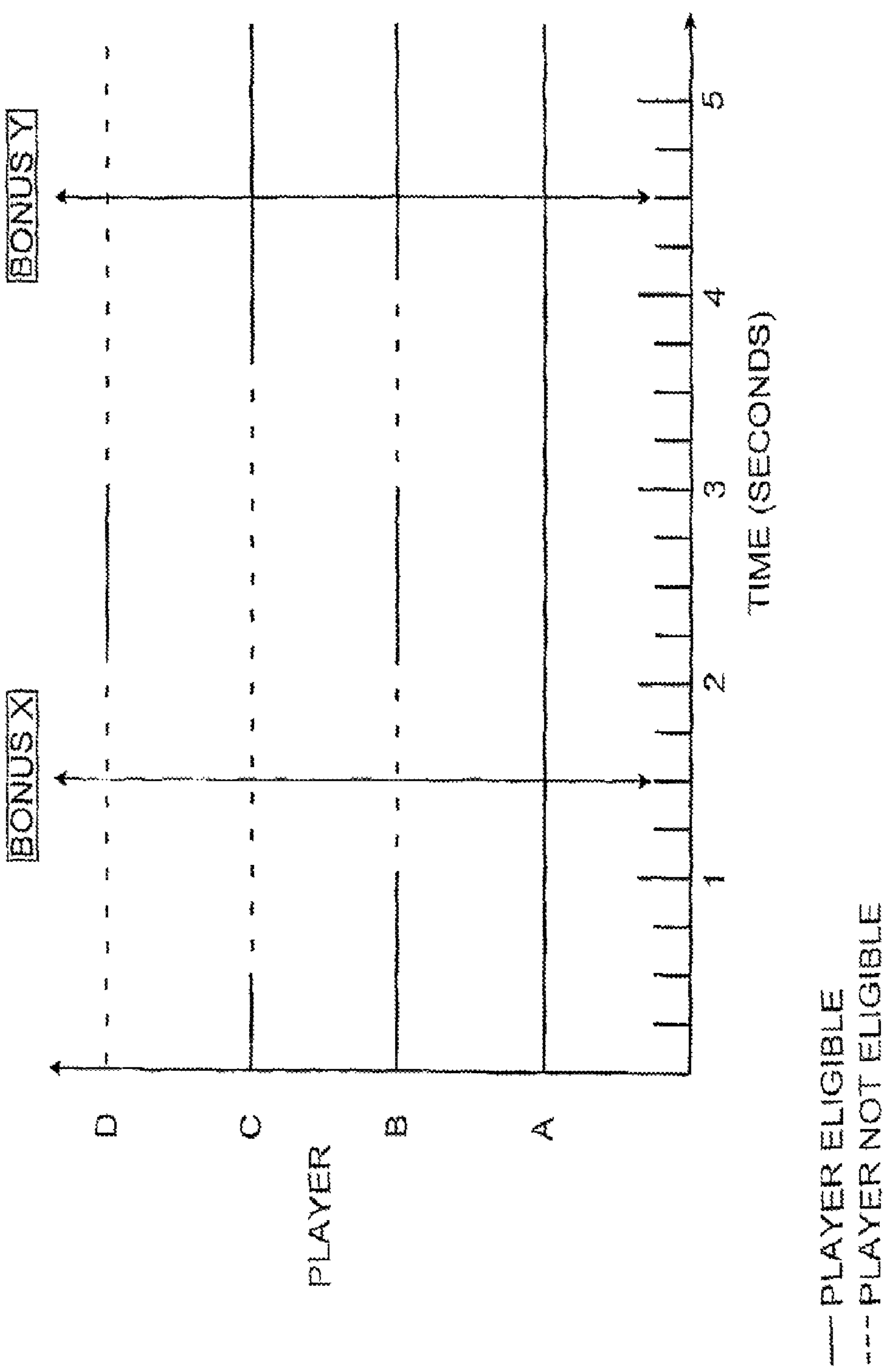
FIG. 13 depicts a diagram that illustrates bonus eligibility of a number of wagering game players during a five second interval, according to some example embodiments.

FIG. 13 depicts a diagram that illustrates bonus eligibility of a number of wagering game players during a five second interval, according to some example embodiments. The wagering game players include players A-D. A number of time-based community games include Bonus X and Bonus Y. A solid line indicates that the player is eligible for playing the community games, and a dashed line indicates that the player is ineligible for playing the community games.

Player A is eligible for playing a community game for all 5 seconds of the time interval. Player B is eligible for playing a community game during three distinct time periods of the time interval. Specifically, player B is eligible for playing a community game during the following time periods: 0.0-1.0 seconds, 2.0-3.0 seconds, and 4.0-5.0 seconds. Player C is eligible for playing a community game during two distinct time periods of the time interval. Specifically, player C is eligible for playing a community game during the following time periods: 0.0-0.5 seconds and 3.5-5.0 seconds. Player D is eligible for playing a community game only during the time period between 2.0-3.0 seconds.

Bonus X is triggered at 1.5 seconds of the time interval by a local RNG or a master RNG. Accordingly, only player A is eligible for playing bonus X at this time. Bonus Y occurs at 4.5 seconds of the time interval. Accordingly, only players A-C are eligible for playing bonus Y at this time.

During a community bonus, a base award is the same for all eligible players. However, the base award will be increased according to each player's current multiplier. Thus, even if the two eligible players win the same base award, their individual award might be different. For example, player A has a current multiplier of 3× and player B has current multiplier of 1×. If both players receive a base award of 50 credits while playing bonus X, then player A will receive a total award of 150 credits and player B will receive a total ward of 50 credits.

Time slices can be purchased according to fixed determinations, e.g., a single wager purchases a 250 ms time slice. Alternatively, time slices can be purchased according to random determinations. For example, a first wager purchases a 250 ms time slice while a second wager purchases a 300 ms time slice.

Time slices can be incremented and/or decremented according to fixed determinations, e.g., a 250 ms time slice is incremented and/or decremented every 250 ms of real time. Alternatively, time slices can be randomly incremented and/or decremented. For example, random interrupt signals can be sent by the controller 34 for randomly incrementing and/or decrementing the time slices. Thus, in the above example, a first interrupt signal can be sent after a time interval of 200 ms, a second interrupt signal can be sent after a time interval of 300 ms, a third interrupt signal can be sent after a time interval of 800 ms, etc.

In an alternative embodiment, the gaming machine 10 may have access to both a time-based community game and a traditional individual bonus game, e.g., a symbol-triggered bonus game. If the player is awarded an individual bonus game, the eligibility time continues to decrement during the individual bonus game. Thus, the triggering of the individual bonus game may be received by the player with a negative reaction. To counter, or prevent, the possible negative perception associated the individual bonus game, a portion of the EV return of the individual bonus game can be applied to the time-slice counter. Optionally, the EV can be taken from the overall wagering game, from a time slice, and/or from the individual bonus game.

In one aspect of this alternative embodiment, the applied EV can be used to increase the eligibility time in the time-slice counter. For example, a percentage of the EV is used to increase the eligibility time of the time-slice counter according to a predetermined relationship, wherein the EV percentage is analogous to the wagered amount.

In another aspect of this alternative embodiment, the time-slice counter is temporarily stopped. The time period during which the time-slice counter is stopped depends, for example, on the portion of EV that is being taken and/or on the bonus multiplier. For example, it is assumed that the time-slice counter is stopped for 30 seconds if a player enters an individual bonus game during a game having a wager of five credits per line and a 5× bonus multiplier. If a different player enters an individual bonus game during a game having a wager of five credits per line and a 10× bonus multiplier (instead of a 5× bonus multiplier), the time-slice counter is stopped for only 15 seconds (instead of 30 seconds), taking in account the higher bonus multiplier. Thus, special time-slices (e.g., time slices that are accumulated during the individual bonus game) are created in a separate group of time slices, wherein special time-slices are removed before regular time-slices (e.g., time slices that are not accumulated during the individual bonus game). The removal of the special time-slices temporarily stops the removal of the regular time-slices.

Figure 14:
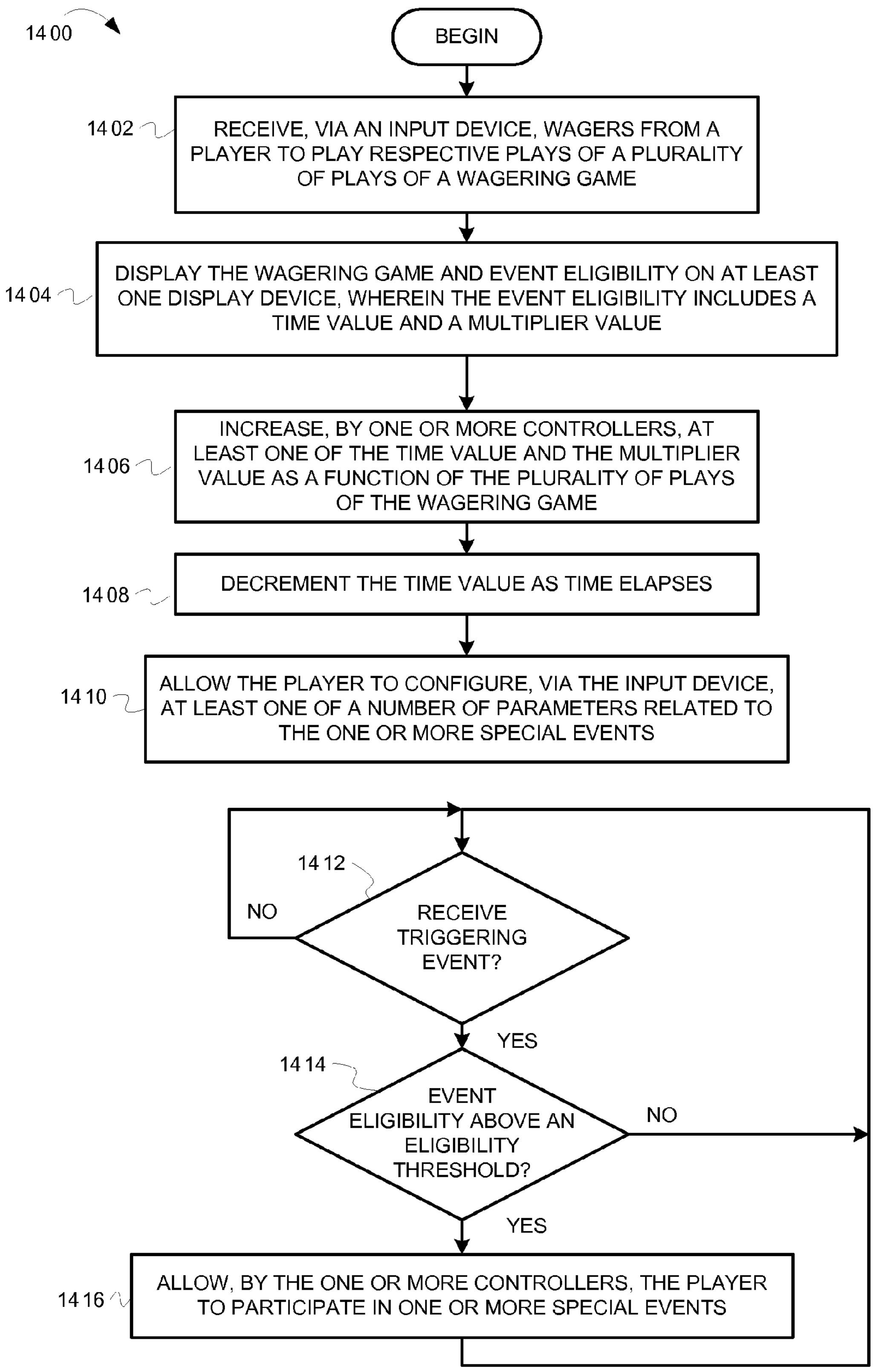
FIG. 14 depicts a flowchart for providing variable parameters for a community game, according to some example embodiments.

FIG. 14 depicts a flowchart for providing variable parameters for a community game, according to some example embodiments. The operations of a flowchart 1400 are described in reference to FIGS. 1-3. The operations are described as being performed by a wagering game module. The operations can be performed by one or multiple wagering game modules. For example with reference to FIG. 1, the wagering game module can be executing in the wagering game server 114. Alternatively or in addition, the operations can be performed by multiple wagering game modules that are distributed across different devices. For example, wagering game modules executing in the wagering game machines 102-108, the wagering game server 114, the mobile devices 116-118, and the computers 120-122 can perform the operations of the flowchart 400. The wagering game module can be software, firmware, hardware or a combination thereof. For example, the wagering game module can be software executing on a processor. An example of such a wagering game module in a wagering game machine is described below in reference to FIG. 25. The operations of the flowchart 1400 begin at block 1402.

At block 1402, a wagering game module receives, via an input device, wagers from a player to play respective plays of a plurality of plays of a wagering game. With reference to FIG. 1, the wagering game module (which can be executing in one or more of the wagering game machines 102-108, the wagering game server 114, the mobile devices 116-118, and the computers 120-122) can the plays from the player. For example, the plays can be any type of player activity related to the wagering game (e.g., wagers, input of monies for wagering, etc.). Operations of the flowchart 1400 continue at block 1404.

At block 1404, the wagering game module displays the wagering game and event eligibility on at least one display device, wherein the event eligibility includes a time value and a multiplier value. With reference to FIG. 4, the wagering game module can display the wagering game in the section 402 as a number of movable reels that represent the reels for basic game play. The event eligibility can be displayed in the section 408. The time values is shown in the first eligibility bar 418 and the second eligibility bar 420. The current multiplier value is shown in the multiplier indicator 416. Operations of the flowchart 1400 continue at block 1406.

At block 1406, the wagering game module increases at least one of the time value and the multiplier value as a function of the plurality of plays of the wagering game. As described above, at least one of the time values and the multiplier values increase based on the plays of the player. For example, the player can receive a certain number of time slices of eligibility at a current multiplier level or increased multiplier level based on the amount wagered, the amount of coin-in, etc. Operations of the flowchart 1400 continue at block 1408.

At block 1408, the wagering game module decrements the time value as time elapses. As described above, the time value is decremented over time. Accordingly, if a player does not perform plays that increase the event eligibilities (e.g., the time values at given multiplier values), the time value will decrement to zero. If the time value is zero for the multiplier values, the player would then be ineligible for the community game if a triggering event occurred. Operations of the flowchart 1400 continue at block 1410.

At block 1410, the wagering game module allows the player to configure, via the input device, at least one of a number of parameters related to the one or more special events. This configuration by the player can occur at any point in the operations of the flowchart 1400. Also, the player can reconfigure at a later point in time. As an example, the wagering game module can allow the player to configure these parameters after the player has logged in to their player account, added wagering game credits to the wagering game machine, etc. With reference to FIG. 4, the player can configure four parameters in the subsections of the section 406—timing of bonus usage, size of bonus multipliers, size of bonus time slice, and community game designation. Operations of the flowchart 1400 can continue at block 1402 where additional wagers can be received.

Also, operations (blocks 1412-1416) for monitoring a triggering event for activation of one or more special events can be performed independent of the operations at blocks 1402-1410.

At block 1412, the wagering game module determines whether a triggering event has occurred. The triggering event can be based on a random determination and can occur periodically. As described above, the triggering event is an event to initiate a start of a community game for players that are eligible based on their accumulated time slices. If there are multiple community games, the triggering event can be for one or more of these community games. For example in some configurations, each community game can have its own triggering event. If there is no triggering event, operations remain at block 1412. Otherwise if there is a triggering event, operations continue at block 1414.

At block 1414, the wagering game module determines whether the event eligibility for the player is above an eligibility threshold. As described above, the eligibility threshold can be defined as a non-zero time value at any multiplier value. Accordingly, the wagering game module can determine whether there are any time slices accumulated for this player for this particular community game. If there is no event eligibility for the player for this particular event (e.g., community game), operations of the flowchart 1400 continue at block 1412. Otherwise, operations of the flowchart 1400 continue at block 1416.

At block 1416, the wagering game module allows the player to participate in one or more special events (e.g., community games). The wagering game module can allow the player to participate using any of the parameters that the player configured or the default values for the parameters if the player did not configure. Operations of the flowchart 1400 continue at block 1412 for monitoring of receiving of a next triggering event for a next event.

Online Game Play Affecting Land-Based Game Play (or Vice Versa)

This section provides a description of a community game that includes both land-based game play and online game play, wherein the community game can be configured such that play by the online wagering game player can affect a community game of the land-based wagering game player. The affecting of the community game can include any type of factoring or change of a random result within the community game. In some example embodiments, the affecting by the online game play is modifying a result of the community game for the land-based game play. For example, assume that the community game includes a picking game. The online players can make their selections (e.g., boxes). If the land-based player selects the selection that a predetermined number of the online players selected (e.g., majority), the land-based player is given a winning result of the picking game.

In another example, the online players can create a world for the community game based on their selections. For example, the online players can create objects that affect the physics of the game play of the community game. The land-based players can then play this community game to determine a result. In another example, the online game play can affect the land-based game play by replacing at least one Random Number Generator (RNG) result of the community game based on a result of some game played by the online game players. In some example embodiments, the online game play can affect the land-based game play by increasing or decreasing odds of a winning result based on a game played by the online wagering game players. For example, if the online wagering game players make the right selections in a picking game, their associated team members for land-based game play have increased odds of a winning result in the community game.

In some example embodiments, a result of the land-based gaming play (affected by the online gaming play) for the community game does not affect a result of the online gaming play. Alternatively, a result of the land-based gaming play (affected by the online gaming play) for the community game does affect a result of the online gaming play. For example, if the land-based gaming play has a winning result based on online gaming play from a group of online wagering game players, this group of online wagering game players are also awarded a winning result for the community game.

In some example embodiments, the online player can select a team among a number of teams in the land-based play. Accordingly, a result for a given team for the land-based game play of the community game is also the result for online players that selected that given team. In some example embodiments, the affecting of the community game is a change in the visual being presented (not necessarily affecting a result of the community game). For example, if the online player and the land-based player are on a same team, the online player can be visually represented on the display of the community game as being on the same team. For example, if the land-based player in the community game is represented as a pirate ship (see examples described below), the online player can be visually represented as a pirate on that ship on the display for the community game for the land-based play. Also, while described such that the online wagering game player can affect community game for the land-based wagering game player, in some example embodiments, the land-based wagering game player can affect the community game for the online-wagering game player. This section will discuss FIGS. 15-24.

Figure 15:
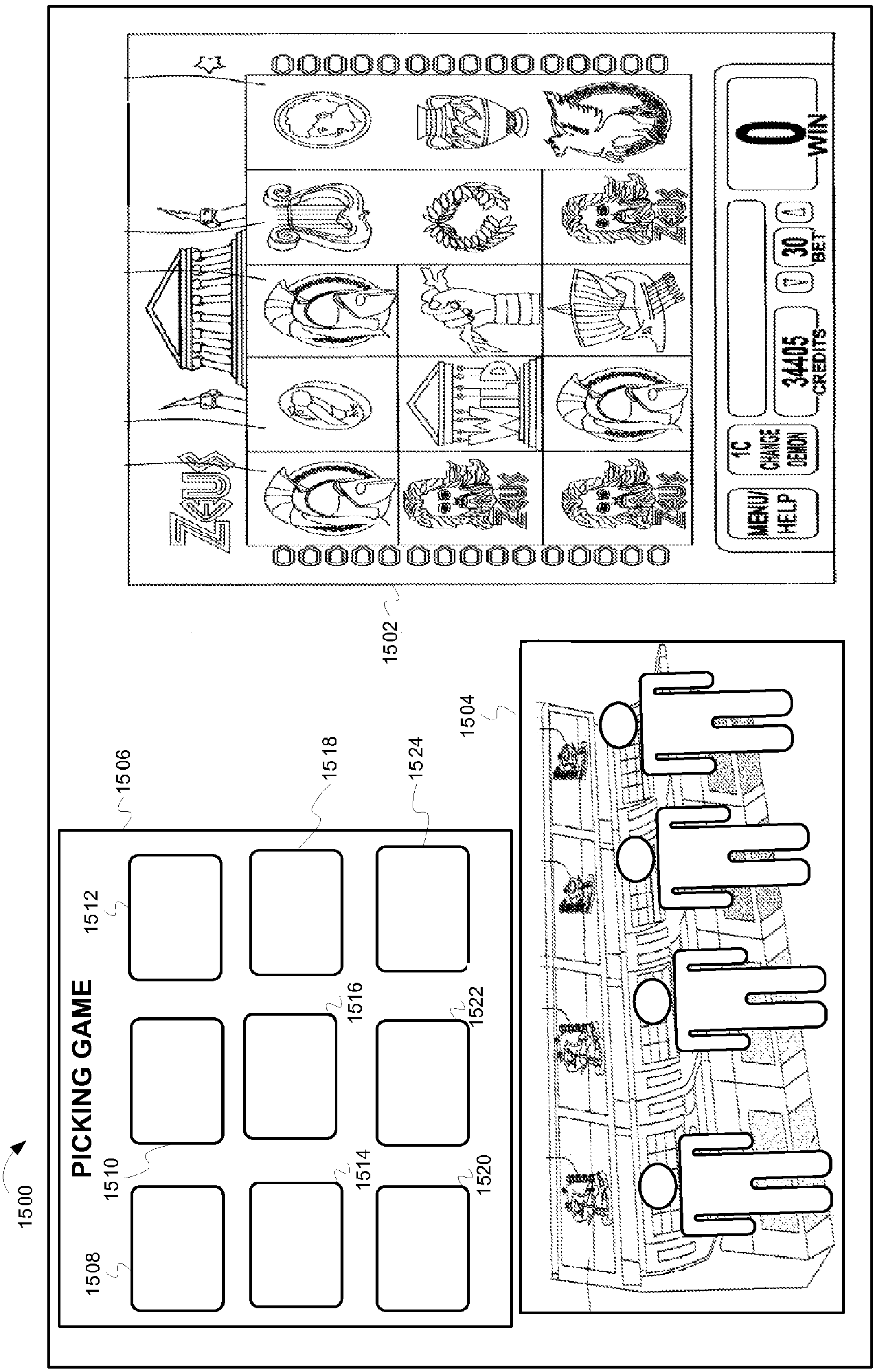
FIG. 15 depicts a game play screen presented to wagering game players (either online or land-based) to play a game whose result affects a result of a wagering game play for the other wagering game players (either online or land-based), according to some example embodiments.

FIG. 15 depicts a game play screen presented to wagering game players (either online or land-based) to play a game whose result affects a result of a wagering game play for the other wagering game players (either online or land-based), according to some example embodiments. In some example embodiments, this game play screen is presented to either the online wagering game players or the land-based wagering game players (but not to both groups of players). The group of wagering game players not presented with this game play screen can be presented with the game play screens depicted in FIGS. 2-3 (described above).

FIG. 15 depicts a game play screen 1500 that includes a section 1502 that portrays a number of movable reels that represent the reels for basic game play. As further described below, a separate screen or screens can display a community game. Additionally, the game play screen 1500 includes a section 1504 that provides a video of the actual game play of the other group of wagering game players. For example, if this game play screen is being presented to the online wagering game players, the online wagering game players can view the reactions and activity of the land-based wagering game players that are shown in the section 1504.

The game play screen 1500 also includes a section 1506 that presents a secondary game for game play. In this example, the secondary game includes a picking or selection game, wherein the wagering game player selects boxes until an end-of-game symbol is revealed. The wagering game player is then awarded what was revealed behind boxes until the end-of-game symbol is revealed. The picking game includes boxes 1508-1524. The wagering game player inputs a selection of one box at a time wherein a reveal of a winning symbol (e.g., multipliers, free spins, etc.) or end-of-game symbol is revealed.

Figure 16:
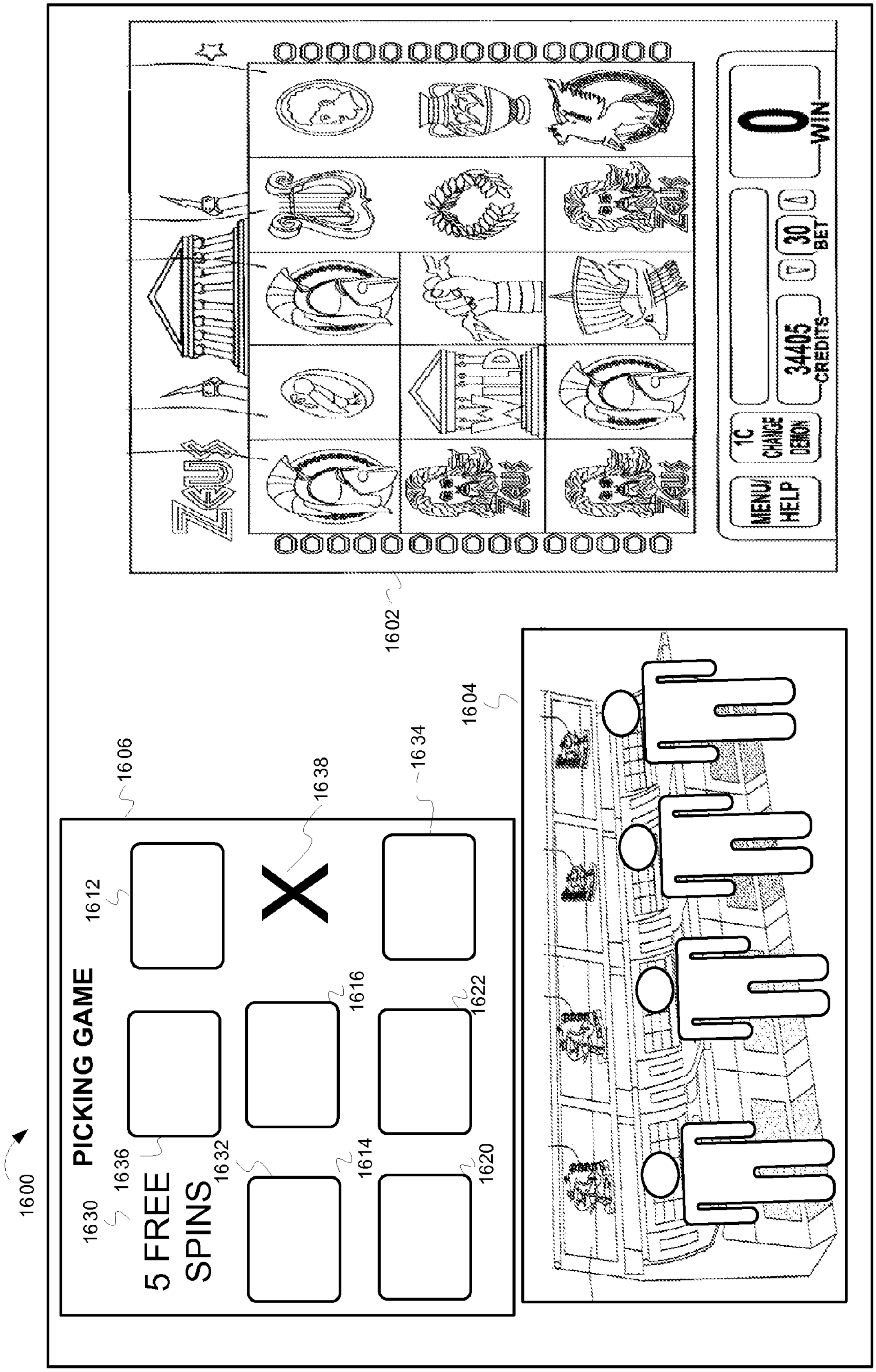
FIG. 16 depicts a game play screen presented to wagering game players (either online or land-based) wherein the game is completed whose result affects a result of a wagering game play for the other wagering game players (either online or land-based), according to some example embodiments.

To better illustrate, FIG. 16 depicts a game play screen presented to wagering game players (either online or land-based) wherein the game is completed whose result affects a result of a wagering game play for the other wagering game players (either online or land-based), according to some example embodiments. In particular, FIG. 16 depicts a game play screen 1600 that is the game play screen 1500 of FIG. 15 after the secondary game has been played.

The game play screen 1600 that includes a section 1602 that portrays a number of movable reels that represent the reels for basic game play. As further described below, a separate screen or screens can display a community game. Additionally, the game play screen 1600 includes a section 1604 that provides a video of the actual game play of the other group of wagering game players. For example, if this game play screen is being presented to the online wagering game players, the online wagering game players can view the reactions and activity of the land-based wagering game players that are shown in the section 1604.

The game play screen 1600 also includes a section 1606 that presents the secondary game after its completion. In this example, the result of the secondary game is a reveal of 5 free spins (1630) prior to revealing the end-of-game symbol (X) (1638). The other boxes (1612, 1636, 1632, 1616, 1620, 1622, and 1634) remain unrevealed because of the revealing of the end-of-game symbol. In this example, the 5 free spins would be awarded to the affected game play. For example, if the online game play was playing the picking game, the land-based player would be awarded the 5 free spins.

The secondary game described in reference to FIGS. 15-16 is one example of such a game that affects result of the other game play for the community game. The secondary game can be a game of chance, a game of skill or a combination thereof. For example, the secondary game can be a selection or picking game as described in reference to FIGS. 15-16. The secondary game can also be poker, blackjack, etc.

In some example embodiments, the secondary game is presented in response to a request from game play of the community game by the other type of wagering, wherein a result is needed. For example, assume that the community game relates to a pirate battle (as further described below) wherein the online game play affects the land-based game play. The result can be a determination of whether a cannonball hits an opposing player's pirate ship for the community game for the land-based game play. A result of a picking game by one or more online wagering game players can determine whether the cannon ball hits the opposing player's pirate ship.

In some example embodiments, the wagering game players for the land-based game play and the online game play are part of teams. Accordingly, a wagering game player for online game play that is providing a result of a secondary game is on the same team as the wagering game player for the land-based game play. The result of the secondary game from the online game play can affect the result for the land-based game play.

In some example embodiments, more than wagering game player can affect the result. With reference to the example above, two or more online wagering game players can play a secondary game, wherein a combined result from the secondary game play affects the result for the land-based game play. For example, three online wagering game players and a land-based player can be on a same team. If at least two of the online wagering game players have a win at their individual secondary game, then the land-based player receives a winning result for their land-based game play during the community game. In some other example embodiments, the multiple online wagering game player can play a same secondary game (e.g., a picking or selection game), wherein a win from the combined secondary game dictates a winning result for the land-based game play.

Figure 17:
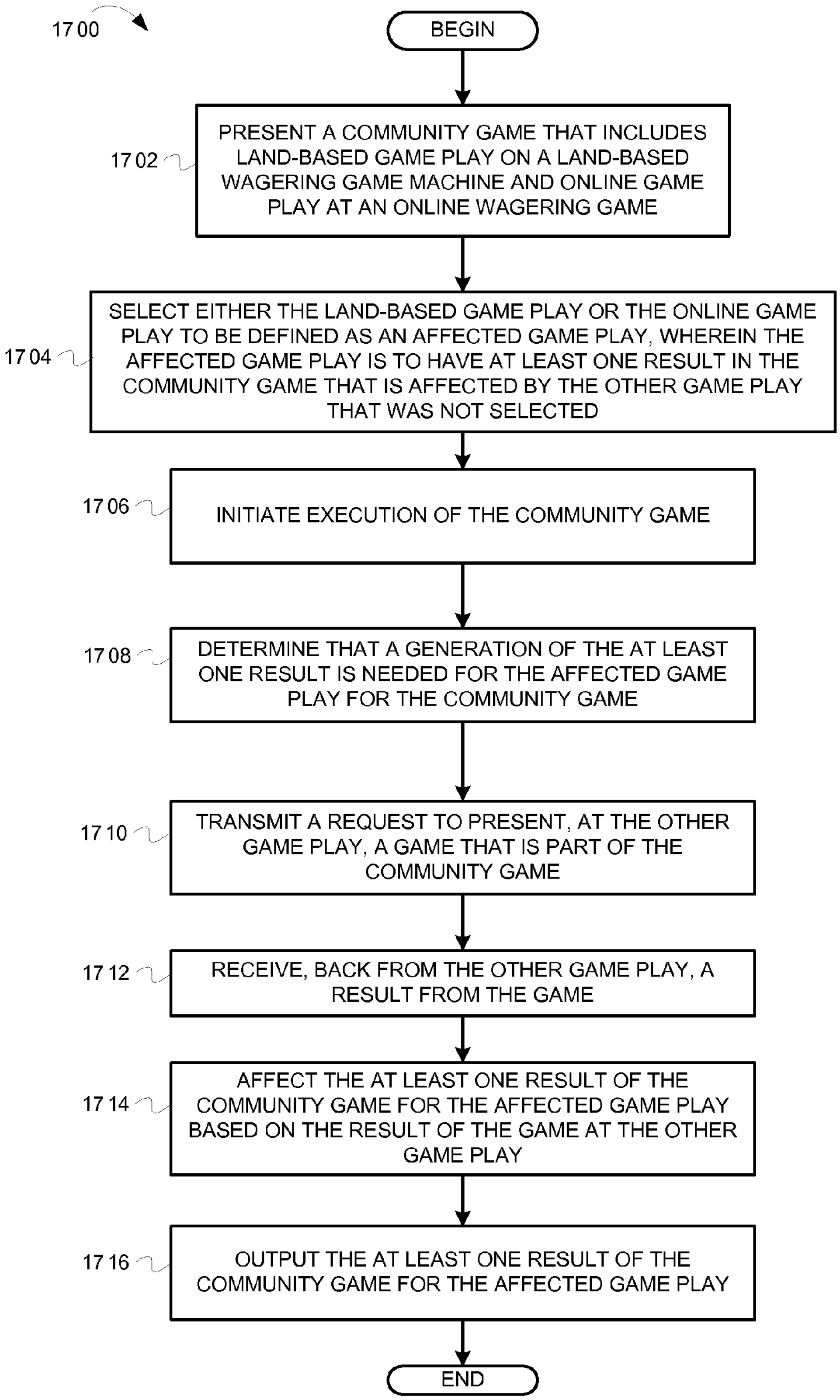
FIG. 17 depicts a flowchart from the perspective of a game play (either land-based or online) that is requesting that a secondary game be played by the other type of game play (either land-based or online) to affect a result, according to some example embodiments.
Figure 18:
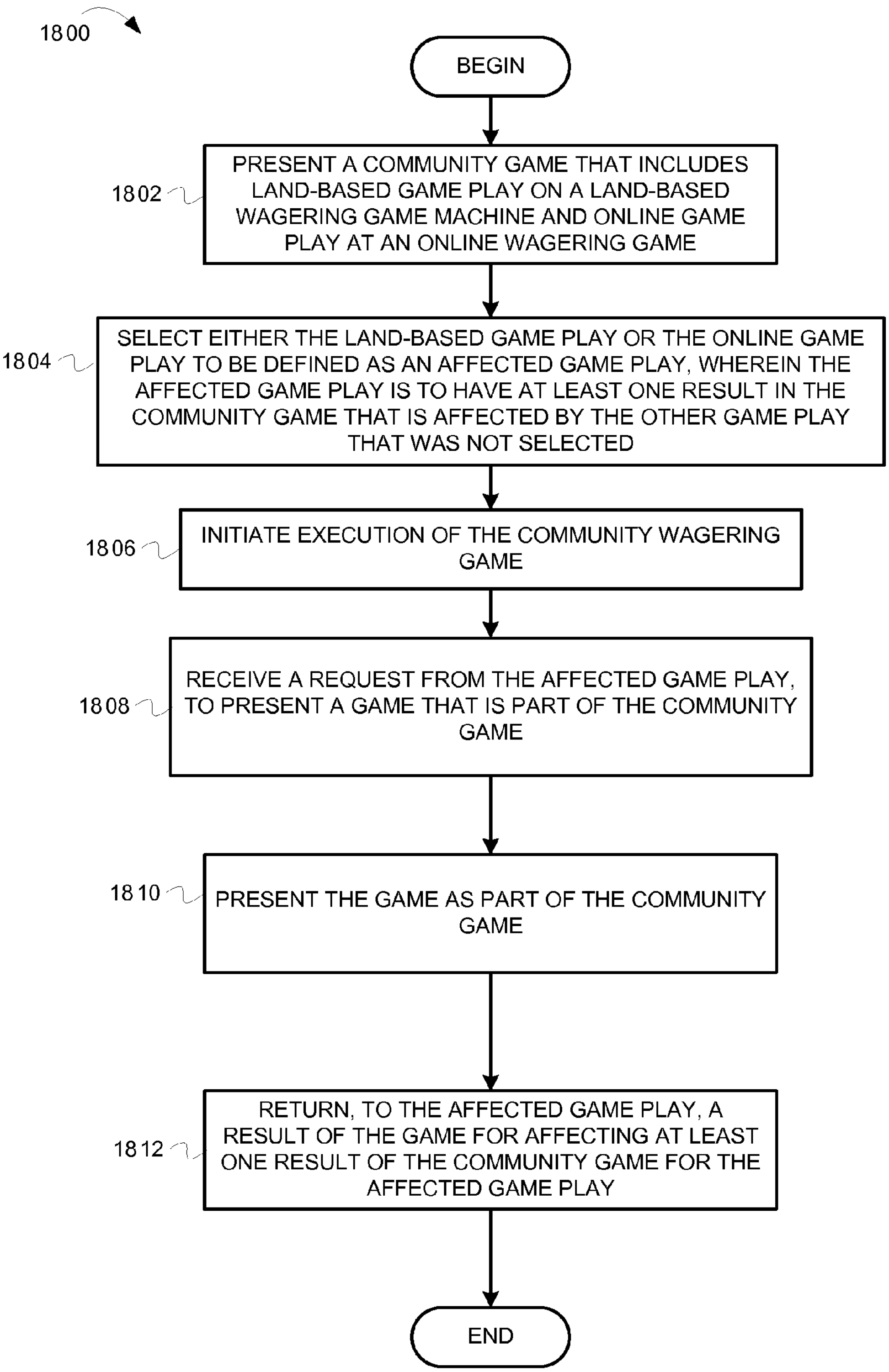
FIG. 18 depicts a flowchart from the perspective of a game play (either land-based or online) that receives a request to present a secondary game and return the results thereof to the other type of game play (either land-based or online) to affect a result for the other type of game play, according to some example embodiments.

Two different flowcharts are now described. In particular, FIG. 17 illustrates operations from the perspective of the game play that is requesting that a secondary game be played by the other type of game play to affect a result. FIG. 18 illustrates operations from the perspective of the game play that receives the request to present a secondary game and return the results of the secondary game to the other type of game play.

In particular, FIG. 17 depicts a flowchart from the perspective of a game play (either land-based or online) that is requesting that a secondary game be played by the other type of game play (either land-based or online) to affect a result, according to some example embodiments. The operations of a flowchart 1700 are described in reference to FIGS. 1 and 15-16. The operations are described as being performed by a wagering game module. The operations can be performed by one or multiple wagering game modules. For example with reference to FIG. 1, the wagering game module can be executing in the wagering game server 114. Alternatively or in addition, the operations can be performed by multiple wagering game modules that are distributed across different devices. For example, wagering game modules executing in the wagering game machines 102-108, the wagering game server 114, the mobile devices 116-118, and the computers 120-122 can perform the operations of the flowchart 400. The wagering game module can be software, firmware, hardware or a combination thereof. For example, the wagering game module can be software executing on a processor. An example of such a wagering game module in a wagering game machine is described below in reference to FIG. 25. The operations of the flowchart 1700 begin at block 1702.

At block 1702, the wagering game module presents a community game that includes land-based game play on a land-based wagering game machine and online game play at an online wagering game. With reference to FIG. 1, the wagering game module (which can be executing in one or more of the wagering game machines 102-108, the wagering game server 114, the mobile devices 116-118, and the computers 120-122) presents a community game that includes both land-based game play and online game play to at least one wagering game player at a land-based wagering device and at least one wagering game player at an online wagering device, respectively. Operations of the flowchart 1700 continue at block 1704.

At block 1704, the wagering game module selects either the land-based game play or the online game play to be defined as an affected game play, wherein the affected game play is to have at least one result in the community game that is affected by the other game play that was not selected. The affected game play is defined to be either the land-based or the online game play. The other game play (either land-based game play or the online game play) is the game play that is affecting the affected game play. For example, if the land-based game play is the affected game play, the online game play is the other game play. Conversely, if the online game play is the affected game play, the land-based game play is the other game play. With reference to FIG. 1, this selection can be preconfigured by the operator of the wagering game establishment 110 that includes the wagering game machines 102-108; preconfigured by the developer of the community game; dynamically determined by the wagering game players that are to play the community game, etc. Operations of the flowchart 1700 continue at block 1706.

At block 1706, the wagering game module initiates play of the community game. For example, the wagering game module can randomly initiate play of the community game. Any of the players (both online and land-based) that are eligible to enter the community game from their individual base games at their wagering game machines can enter the community game. Operations of the flowchart 1700 continue at block 1708.

At block 1708, the wagering game module determines that a generation of the at least one result is needed for the affected game play for the community game. For example, a wagering game machine that is part of the land-based game play for the community game can be presenting the game wherein a point is reached in the game wherein a result is needed. The result can be a specific random result in the community game, a specific random result for a team-based community game, all random results for the community game, etc. For example, the result can be a determination of whether a cannonball hits an opposing player's pirate ship for the community game for the land-based game play. A result of a picking game by one or more online wagering game players can determine whether the cannon ball hits the opposing player's pirate ship. Operations of the flowchart 1700 continue at block 1710.

At block 1710, the wagering game module transmits a request to present, at the other game play, a game that is part of the community game. The wagering game module can transmit this request to a different wagering game module that is presenting the community game for the other game play. For example, the wagering game module for the land-based game play can transmit this request to the wagering game module for one or more of the online game play. With reference to FIG. 1 as an example, a wagering game module executing on the wagering game machine 102 can transmit a request to the wagering game module executing on the wagering game server 114 for one or more of the devices providing the online game play. With reference to FIGS. 15-16, the secondary game can be a selection game as shown in sections 1506-1606. The secondary game can be a game of chance, a game of skill or a combination thereof. For example, the secondary game can be a selection or picking game as described in reference to FIGS. 15-16. The secondary game can also be poker, blackjack, etc. Operations of the flowchart 1700 continue at block 1712.

At block 1712, the wagering game module receives, back from the other game play, a result from the game. For example, the wagering game module can return an indication whether the result was a win or a loss. Alternatively or in addition, the wagering game module can return an indication of the size or type of win. Operations of the flowchart 1700 continue at block 1714.

At block 1714, the wagering game module affects at least one result of the community game for the affected game play based on the result of the game at the other game play. The affecting of the community game can include any type of factoring or change of a random result within the community game. In some example embodiments, the affecting by the online game play is modifying a result of the community game for the land-based game play. For example, assume that the community game includes a picking game. The online players can make their selections (e.g., boxes). If the land-based player selects the selection that a predetermined number of the online players selected (e.g., majority), the land-based player is given a winning result of the picking game. In another example, the online players can create a world for the community game based on their selections. For example, the online players can create objects that affect the physics of the game play of the community game. The land-based players can then play this community game to determine a result. In another example, the online game play can affect the land-based game play by replacing at least one Random Number Generator (RNG) result of the community game based on a result of some game played by the online game players. In some example embodiments, the online game play can affect the land-based game play by increasing or decreasing odds of a winning result based on a game played by the online wagering game players. For example, if the online wagering game players make the right selections in a picking game, their associated team members for land-based game play have increased odds of a winning result in the community game. In some example embodiments, the affecting of the community game is a change in the visual being presented (not necessarily affecting a result of the community game). For example, if the online player and the land-based player are on a same team, the online player can be visually represented on the display of the community game as being on the same team. For example, if the land-based player in the community game is represented as a pirate ship (see examples described below), the online player can be visually represented as a pirate on that ship on the display for the community game for the land-based play. Also, while described such that the online wagering game player can affect the land-based wagering game player, in some example embodiments, the land-based wagering game player can affect the online-wagering game player. Operations of the flowchart 1700 continue at block 1716.

At block 1716, the wagering game module outputs at least one result of the community game for the affected game play. For example, the wagering game module can issue wagering game credits, bonus multipliers, etc for a result of the community game. Operations of the flowchart 1700 are complete.

FIG. 18 depicts a flowchart from the perspective of a game play (either land-based or online) that receives a request to present a secondary game and return the results thereof to the other type of game play (either land-based or online) to affect a result for the other type of game play, according to some example embodiments. The operations of a flowchart 1800 are described in reference to FIGS. 15-16. The operations are described as being performed by a wagering game module. The operations can be performed by one or multiple wagering game modules. For example with reference to FIG. 1, the wagering game module can be executing in the wagering game server 114. Alternatively or in addition, the operations can be performed by multiple wagering game modules that are distributed across different devices. For example, wagering game modules executing in the wagering game machines 102-108, the wagering game server 114, the mobile devices 116-118, and the computers 120-122 can perform the operations of the flowchart 400. The wagering game module can be software, firmware, hardware or a combination thereof. For example, the wagering game module can be software executing on a processor. An example of such a wagering game module in a wagering game machine is described below in reference to FIG. 25. The operations of the flowchart 1800 begin at block 1802.

At block 1802, the wagering game module presents a community game that includes land-based game play on a land-based wagering game machine and online game play at an online wagering game. With reference to FIG. 1, the wagering game module (which can be executing in one or more of the wagering game machines 102-108, the wagering game server 114, the mobile devices 116-118, and the computers 120-122) presents a community game that includes both land-based game play and online game play to at least one wagering game player at a land-based wagering device and at least one wagering game player at an online wagering device, respectively. Operations of the flowchart 1800 continue at block 1804.

At block 1804, the wagering game module selects either the land-based game play or the online game play to be defined as an affected game play, wherein the affected game play is to have at least one result in the community game that is affected by the other game play that was not selected. The affected game play is defined to be either the land-based or the online game play. The other game play (either land-based game play or the online game play) is the game play that is affecting the affected game play. For example, if the land-based game play is the affected game play, the online game play is the other game play. Conversely, if the online game play is the affected game play, the land-based game play is the other game play. With reference to FIG. 1, this selection can be preconfigured by the operator of the wagering game establishment 110 that includes the wagering game machines 102-108; preconfigured by the developer of the community game; dynamically determined by the wagering game players that are to play the community game, etc. Operations of the flowchart 1800 continue at block 1806.

At block 1806, the wagering game module initiates play of the community game. For example, the wagering game module can randomly initiate play of the community game. Any of the players (both online and land-based) that are eligible to enter the community game from their individual base games at their wagering game machines can enter the community game. Operations of the flowchart 1800 continue at block 1808.

At block 1808, the wagering game module receives a request from the affected game play, to present a game that is part of the community game. The wagering game module can receive this request from a different wagering game module that is presenting the community game for the other type of game play. For example, the wagering game module for the online game play can receive this request from the wagering game module for the land-based game play. With reference to FIG. 1 as an example, a wagering game module executing on the wagering game server 114 for one or more of the devices providing the online game play can receive the request from the wagering game module executing on the wagering game machine 102. Operations of the flowchart 1800 continue at block 1810.

At block 1810, the wagering game module presents the game as part of the community wagering game. With reference to FIGS. 15-16, the wagering game module can present the secondary game as a selection game as shown in sections 1506-1606. The secondary game can be a game of chance, a game of skill or a combination thereof. For example, the secondary game can also be poker, blackjack, etc. Operations of the flowchart 1800 continue at block 1812.

At block 1812, the wagering game module returns, to the affected game play, a result of the game for affecting at least one result of the community game for the affected game play. For example, the wagering game module can return an indication whether the result was a win or a loss. Alternatively or in addition, the wagering game module can return an indication of the size or type of win. In some example embodiments, the wagering game player that played the secondary game wherein a win occurred receives an award also. For example, if gaming credits are awarded as result of the community game win because of the play of the secondary game, the wagering game player that played the secondary game is awarded the same number of credits, a percentage of the number of credits, etc. Operations of the flowchart 1800 are complete.

Community Game Example

This section provides a description of an example community game that includes both land-based game play and online game play. In particular, FIGS. 19-24 illustrate an example community game having a pirate theme that can include both land-based game play and online game play, according to some example embodiments. In some example embodiments, the other type of game play (e.g., online game play) can provide a secondary game result that substitutes for the random result (e.g., for the land-based game play) (as described above).

Figure 19:
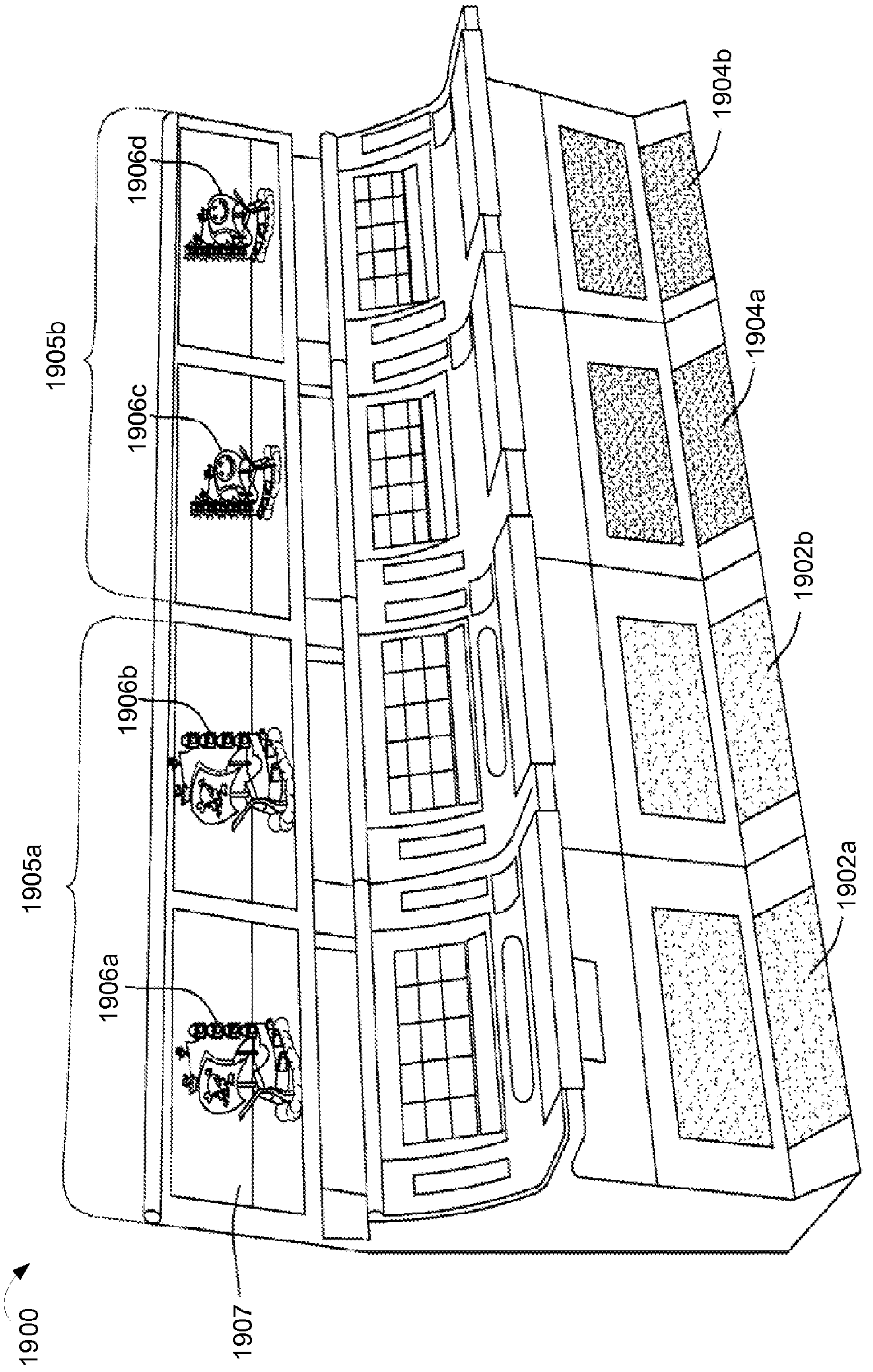
FIG. 19 depicts a perspective view of a group of linked gaming terminals, according to some example embodiments.

FIG. 19 depicts a perspective view of a group of linked gaming terminals, according to some example embodiments. In particular, a group of gaming terminals 1900 is shown. Each individual gaming terminal 1902*a, b* 1904*a, b* in the group of gaming terminals 1900 is a member of a team. In the embodiment of FIG. 19, for example, gaming terminals 1902*a*, 1902*b* form a first team 1905*a* (e.g., Team 1), and gaming terminals 1904*a* and 1904*b* form a second team 1905*b* (e.g., Team 2). A player playing the gaming terminal 1902*a* will herein be referred to as Player 1A, and a player playing the gaming terminal 1902*b* will be referred to as Player 1B. Similarly, a player playing the gaming terminal 1904*a* will be referred to herein as Player 2A, and a player playing the gaming terminal 1904*b* will be referred to as Player 2B. Each of the gaming terminals 1900 can provide land-based wagering. In some example embodiments, additional wagering game players can be part of the same community game through online game play. For example, one or more online wagering game players can be on one of the defined teams.

Each gaming terminal 1902*a, b*, 1904*a, b* of the illustrated embodiment includes a "Pirate" theme and displays a respective pirate ship 1906*a*-1906*d* on the secondary display area 1907. As will be described in detail below, the secondary display areas 1907 of the gaming terminals 1902*a, b*, 1904*a, b* can function together as a single, continuous "metascreen," displaying a single, continuous image. Thus, for example, an image may be shown as moving across one of the secondary display areas 1907 of one gaming terminal 1902*a,b*, 1904*a,b* into a secondary display area 1907 of an adjacent gaming terminal 1902*a,b*, 1904*a,b*. Furthermore, during play of the gaming terminals 1902*a, b*, 1904*a, b*, the players on Team 1 (i.e., Player 1A and Player 1B) collaborate with one another and compete against the players on Team 2 (i.e., Player 2A and Player 2B).

Figure 20:
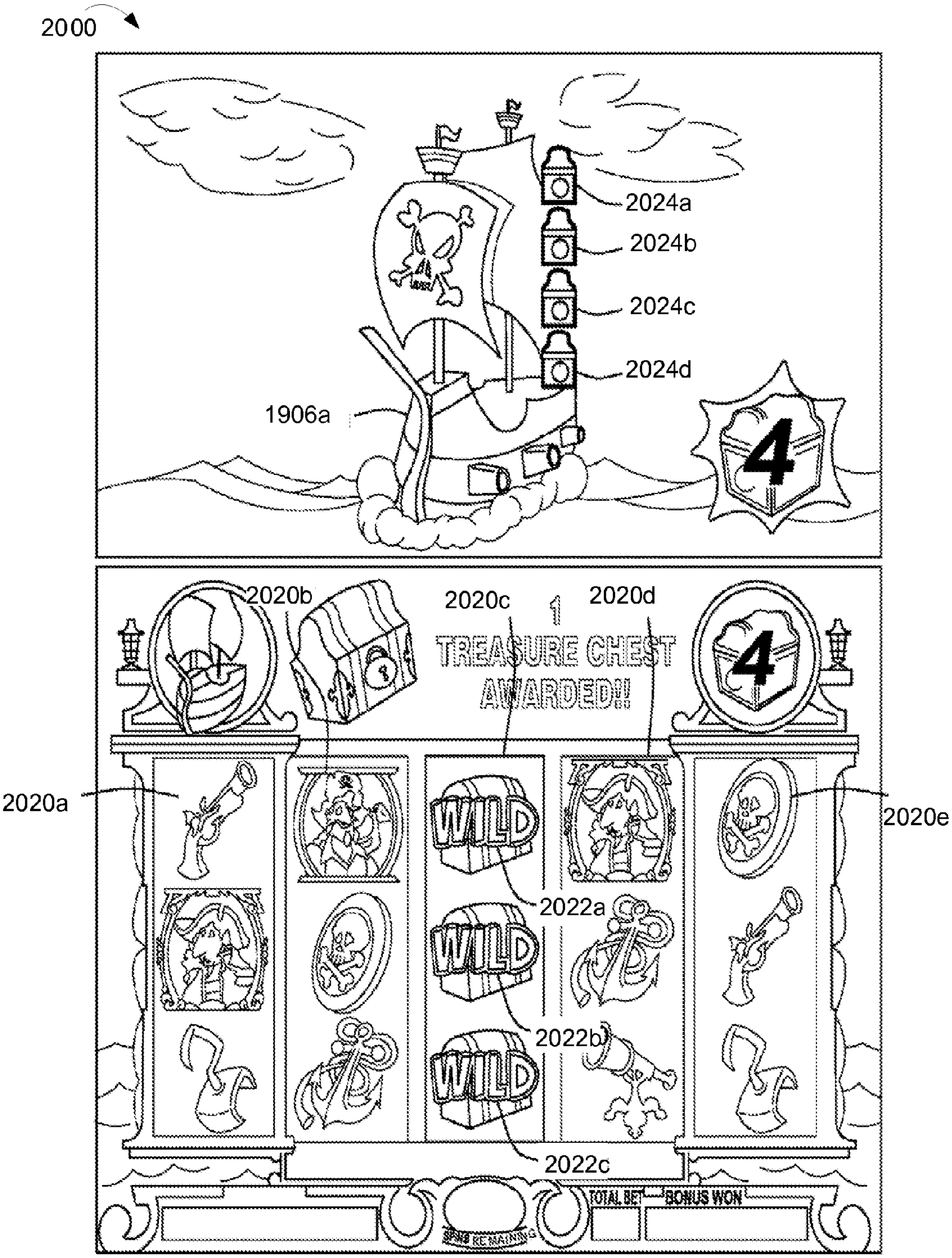
FIG. 20 depicts an image of a community game screen that may be displayed on a gaming terminal, according to some example embodiments.

FIG. 20 depicts an image of a community game screen that may be displayed on a gaming terminal, according to some example embodiments. In particular, a secondary event or community game 2000 is illustrated on the gaming terminal 1902*a* of FIG. 19, according to some example embodiments.

The community game 2000 may be entered upon the occurrence of a special start-community game outcome (e.g., symbol trigger, mystery trigger, etc.) in or during the basic game on any of the gaming terminals 1902*a, b*, 1904*a, b*. Alternatively or additionally, the community game 2000 may be triggered by a time-based trigger. For example, the community game 2000 may be automatically triggered after every 30 seconds of base game play.

In order to participate in the community game 2000, the player playing the gaming terminal 1902*a,b*, 1904*a,b* must be eligible (e.g., the player must have time remaining on the eligibility meter (see description above regarding entering the community game).

During the community game 2000, eligible players receive a predetermined amount of individual bonus spins on the bonus set of reels 2020*a-e* displayed on the primary displays of their respective gaming terminals 1902*a, b*, 1904*a, b*. Each of the players in the group of gaming terminals 1900 receives the same amount of bonus spins, and the bonus set of reels spin simultaneously on all of the gaming terminals 1902*a, b*, 1904*a, b* in the group of gaming terminals 1900.

As illustrated in the embodiment of FIG. 20, when Player 1A achieves three adjacent or "clumped" "WILD CHEST" symbols 2022*a-c* during a bonus spin, a treasure chest 2024 is added to Player 1A's pirate ship 1906*a*. It is contemplated that other outcomes may additionally or alternatively cause a treasure chest 2024 to be added to the player's pirate ship 1906*a* (e.g., a single WILD CHEST symbol 2022 appearing anywhere on the bonus set of reels 2020*a-e*, a predetermined amount of scattered WILD CHEST symbols 2022 appearing on the bonus set of reels 2020*a-e*, or the like). As shown, Player 1A achieved a total of four treasure chests 2024*a-d* during the bonus spins.

After the predetermined number of free spins is concluded, the community game 2000 is terminated. In other embodiments, the community game 2000 is terminated when one or more end-game outcome is achieved. At the end of the community game 2000, the treasure chests 2024 achieved by each player during play of the community game 2000 may be exchanged or converted into a credit award, which is then awarded to the respective player. Each treasure chest 2024 may be worth a fixed amount of credits. In another embodiment, the value of each treasure chest 2024 increases as the amount of treasure chests 2024 achieved increases (e.g., the value of the first treasure chest 2024 achieved is less than the value of the second treasure chest 2024 achieved, which is less than the value of the third treasure chest 2024 achieved, etc.). Each treasure chest 2024 may also have a random value associated therewith. In some example embodiments, the other type of wagering can provide a secondary game result that substitutes for the random value (as described above).

If, during the community game 2000, a player (e.g., Player 1A) achieves a predetermined number of treasure chests 2024, the treasure chests 2024 may be automatically exchanged for a random jackpot award that is awarded to each of the players (e.g., Player 1A and Player 1B) on his or her team (e.g., Team 1). In some example embodiments, the other type of game play can provide a secondary game result that substitutes for the random jackpot award (as described above). A jackpot award of the embodiments described herein is a credit award represented as a monetary value.

Figure 21:
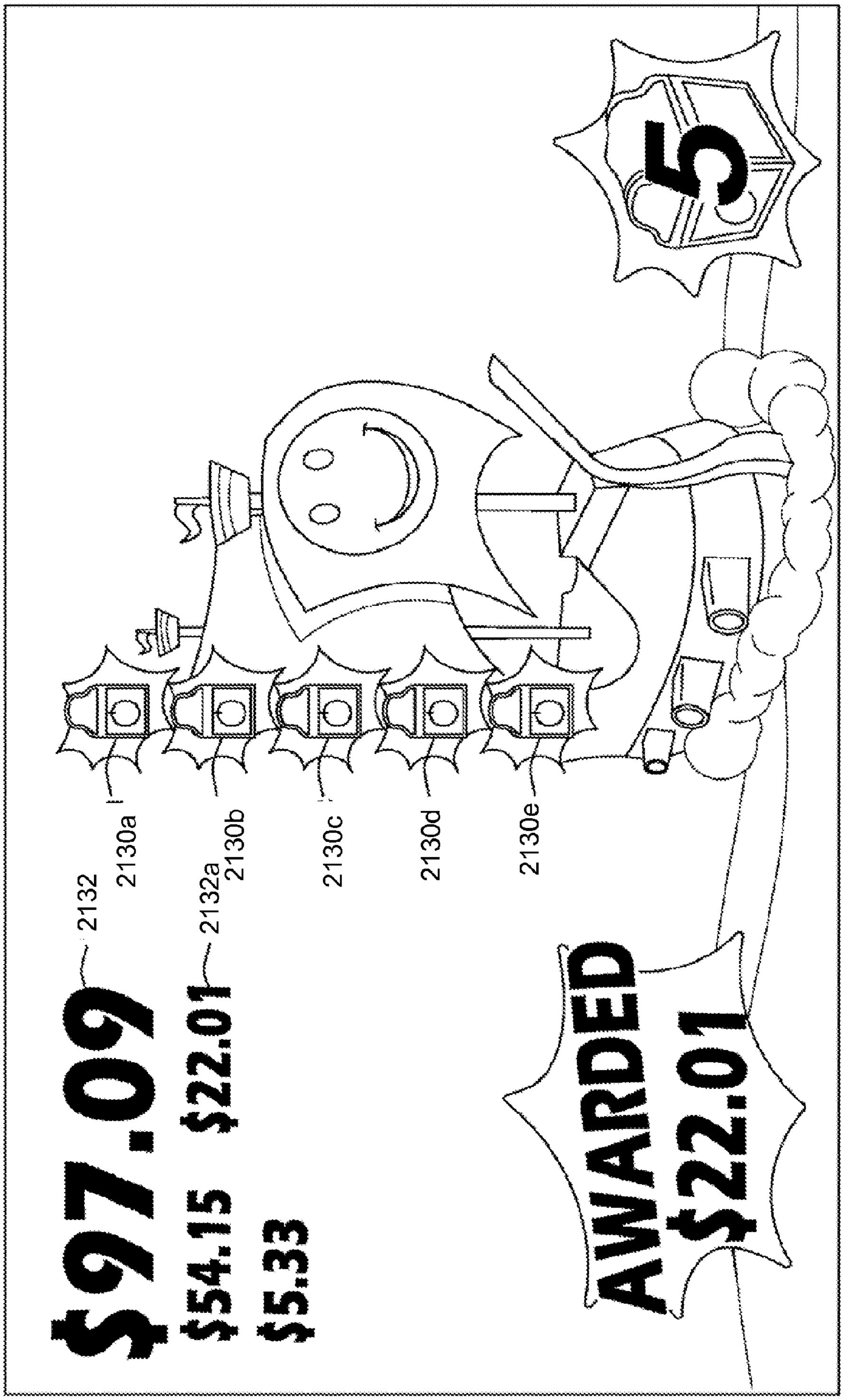
FIGS. 21-24 depict images of community game screens subsequent to the bonus-game screen of FIG. 21, according to some example embodiments.

FIGS. 21-24 depict images of community game screens subsequent to the bonus-game screen of FIG. 21, according to some example embodiments. In the embodiment of FIG. 21, Player 2A playing the gaming terminal 1904*a* (see FIG. 19) has achieved five treasure chests 2130*a-e*. The five treasure chests 2130*a-e* are then automatically traded in for one of the displayed jackpot awards 2132. Which jackpot award 2132 is awarded may be determined in any suitable way, including randomly, blind-selection by the player, or the like. In some example embodiments, the other type of game play can provide a secondary game result that substitutes for the random jackpot award (as described above). Player 2A and all of the players (i.e., Player 2B) on Player 2A's team (i.e., Team 2) are awarded the selected jackpot award 2132*a* of $22.01. Because each of the players on Player 2A's team is awarded the same jackpot award achieved by Player 2A, a sense of community and collaboration is achieved among the players on the team (i.e., Team 2).

In some example embodiments, once a jackpot award 2132*a* is awarded, that award (e.g., $22.01) is removed from the displayed possible jackpot awards 2132 and may no longer be awarded. If only one jackpot award 2132 is displayed, and that award is awarded, that jackpot award 2132 may continue to be displayed after being awarded and may be awarded again. In another embodiment, once all of the displayed jackpot awards 2132 have been awarded and removed from the display, a new set of jackpot awards is displayed.

Figure 22:
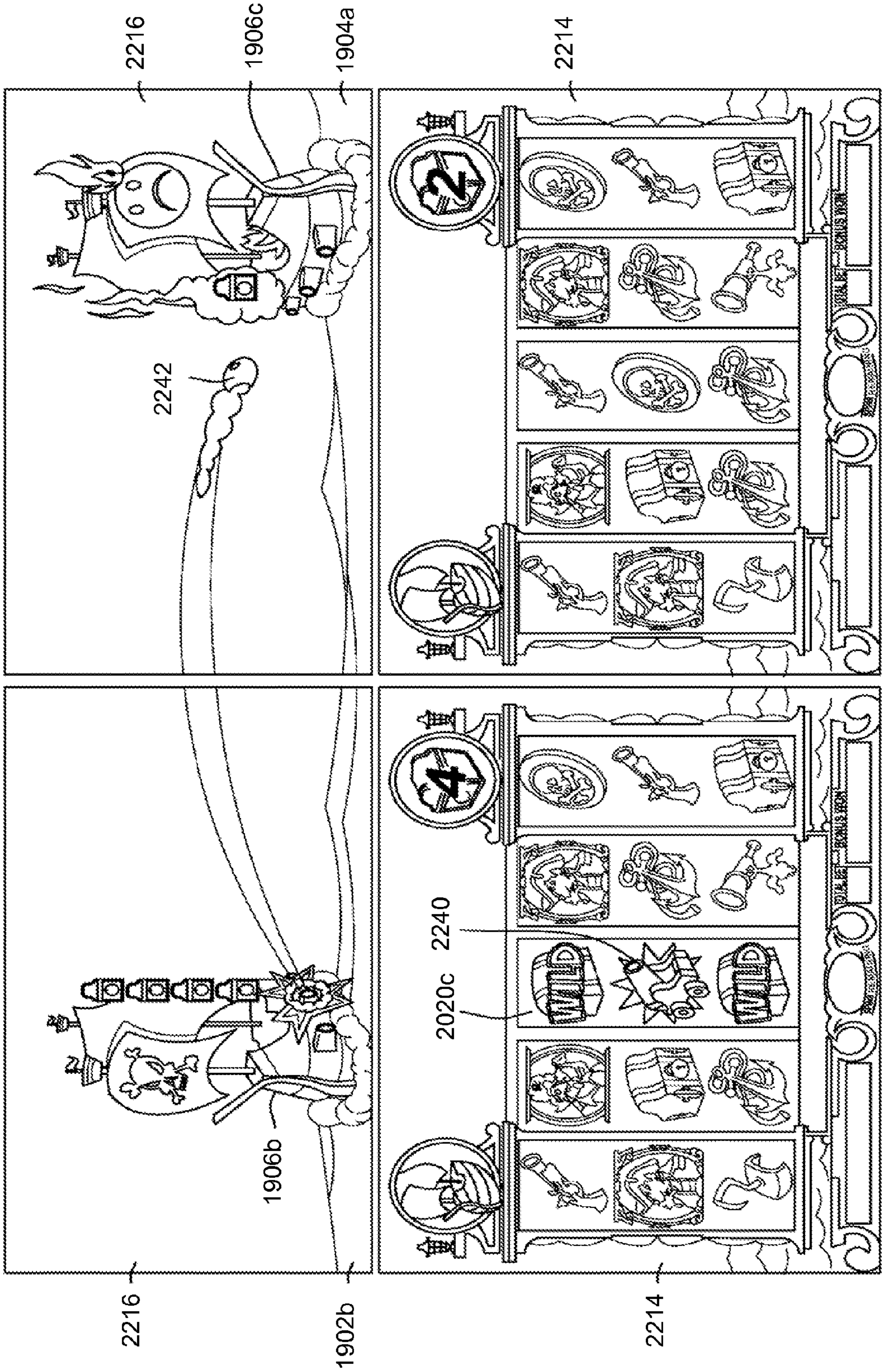

An additional or alternative community game embodiment is shown in FIG. 22. FIG. 22 shows the displays 2214, 2216 of the gaming terminals 1902*b* and 1904*a* of FIG. 19. As illustrated, a "CANNON" symbol 2240 has been achieved by Player 1B on the bonus reel 2020*c* of the community game on the second gaming terminal 1902*b*. The appearance of the CANNON symbol 2240 on one or more of the bonus reels 2020*a-e* triggers a "Pirate Battle" community game. It is contemplated that the Pirate Battle community game may be triggered in other ways including, but not limited to, randomly. During the Pirate Battle community game, a cannonball 2242 launches from the pirate ship 1906*b* at one of the pirate ships 1906*c, d* of the opposing team. Here, the cannonball 2242 launches at Player 2A's pirate ship 1906*c*. The determination of which opposing-team member's pirate ship 1906 is hit by the cannonball 2242 may be made randomly, sequentially, by the player, or in any other suitable way. In some example embodiments, the other type of game play can provide a secondary game result that substitutes for determining whether the cannonball 2242 hits the opposing team's pirate ship (as described above).

In some example embodiments, if a player achieves a predetermined symbol (e.g., an "EVADE" symbol) on one or more of the reels of the bonus set of reels 2020*a-e*, the player's pirate ship 1906 may avoid getting hit by a cannonball 2242 launched from a player on an opposing team. It is contemplated that, in certain embodiments, EVADE symbols may only be achieved on less than all of the reels 2020*a-e*, e.g., the fourth reel 2020*d* and the fifth reel 2020*e*. In some example embodiments, the other type of game play can provide a secondary game result that substitutes for determining the results of the reel spins for the reels 2020*a-e* (as described above).

Hitting a pirate ship 1906 with a predetermined number of cannonballs 2242 causes the pirate ship 1906 to sink. The player who fired the final cannonball that caused the pirate ship 1906 to sink then "steals" the treasure chests accumulated on the sunken ship. Referring to FIGS. 23*a-d*, for example, the secondary display areas 2316 of the four gaming terminals 1902*a, b*, 1904*a, b* are shown. As discussed above, the secondary display areas 2316 of the gaming terminals 1902*a, b*, 1904*a, b*, which are positioned generally adjacent to one another, function as a single, larger "metascreen" 1907. Thus, an object (e.g., a cannonball 2242) is displayed as moving from a secondary display area 2316 of one gaming terminal 1902*a, b*, 1904*a, b* to the secondary display area 2316 of another gaming terminal 1902*a, b*, 1904*a, b*.

Figure 23A:
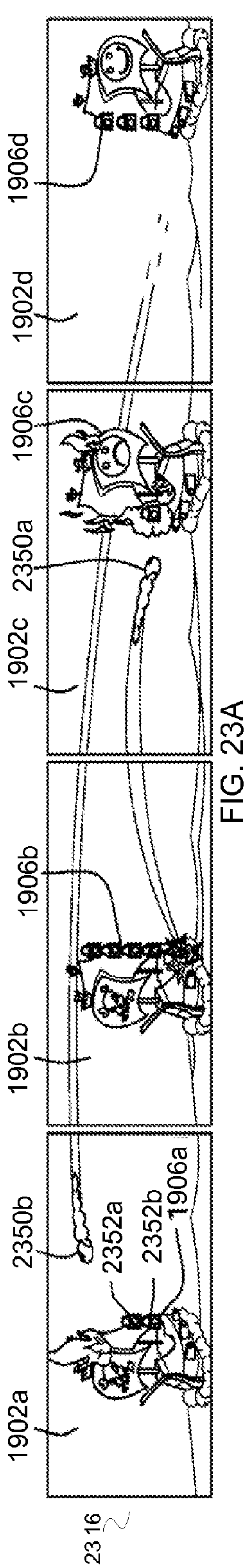
Figure 23B:
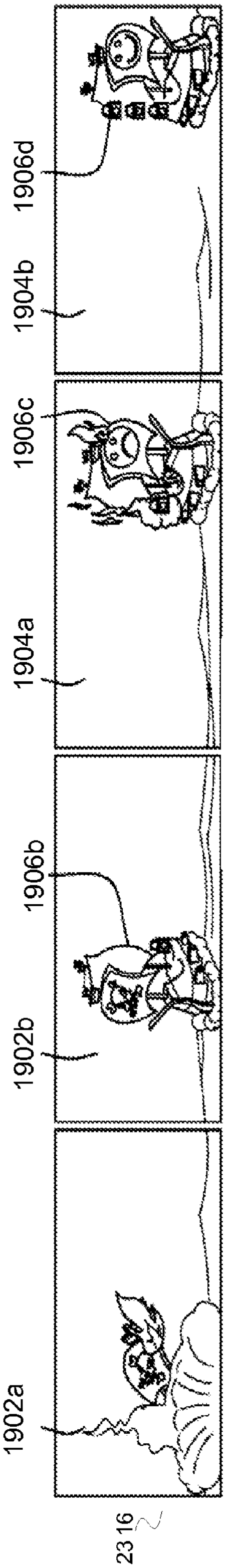
Figure 23C:
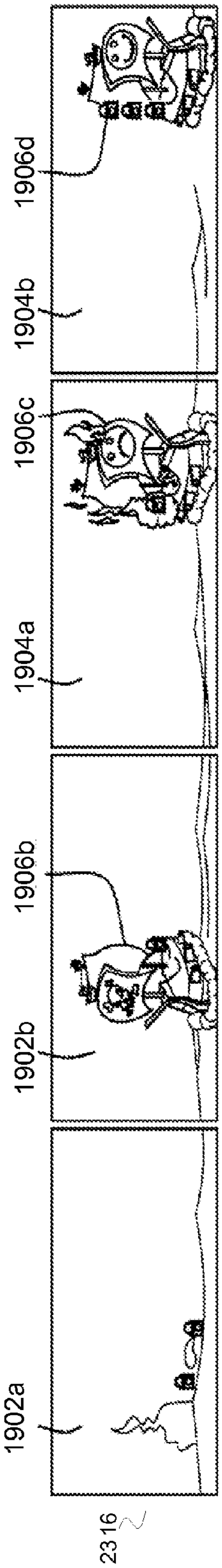
Figure 23D:
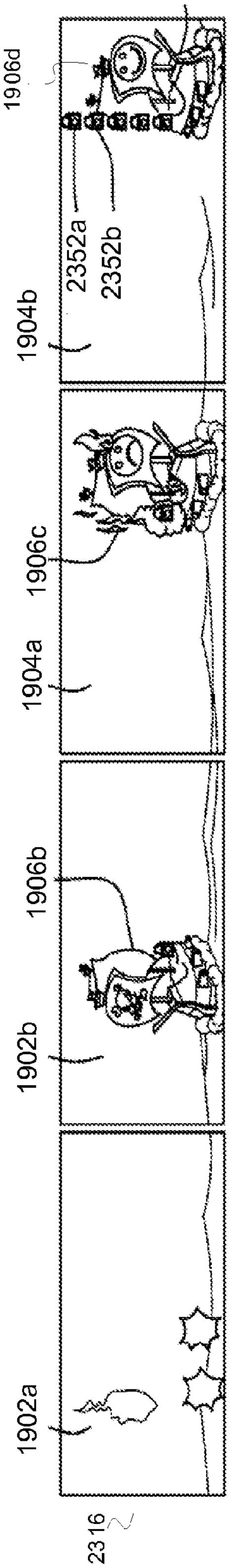

FIG. 23*a* shows Player 1B's pirate ship 1906*b* launching a cannonball 2350*a* at Player 2A's pirate ship 1906*c*. FIG. 23*a* also shows Player 2B's pirate ship 1906*d* launching a cannonball 2350*b* at Player 1A's pirate ship 1906*a*. The cannonballs are displayed on the metascreen 1907 as moving across one or more of the four secondary display areas 2316 of the gaming terminals 1902*a, b*, 1904*a, b*. Thus, it appears as if they cannonballs 2350*a, b* are actually flying through the air from one pirate ship 1906 to another along one continuous display. Because the cannonball 2350*b* launched by Player 2B's pirate ship 1906*d* was the fourth cannonball to hit Player 1A's pirate ship 1906*a*, Player 1A's pirate ship 1906*a* begins to sink, as shown in FIGS. 23*b-d*.

Prior to being sunk, Player 1A's pirate ship 1906*a* included two treasure chests 2352*a, b* (see FIG. 23*a*) achieved by Player 1A during the previous bonus spins. After Player 1A's pirate ship 1906*a* is sunk, Player 1A's treasure chests 2352*a, b* are shown as floating atop the water (see FIG. 23*c*). The treasure chests 2352*a,b* are then "stolen" by Player 2B, who fired the cannonball 2350*b* that ultimately caused Player 1A's pirate ship 1906*a* to sink. Thus, as shown in FIG. 23*d*, the treasure chests 2352*a, b* are added to and displayed on Player 2B's pirate ship 1906*d*.

As shown in the embodiment of FIGS. 23*a-d*, the pirate ships 1906*a-d* may be displayed as progressively looking more damaged after each time they are hit with a cannonball. For example, Player 1B's pirate ship 1906*b* and Player 2B's pirate ship 1906*d* have not been hit by any cannonballs, so they are displayed as being undamaged. Player 2A's pirate ship 1906*c* has been hit by at least one cannonball and is, thus, shown as being on fire. When it appears that two pirate ships 1906 are sinking at the same time, random fire order determines which pirate ship 1906 sinks first.

Figure 24:
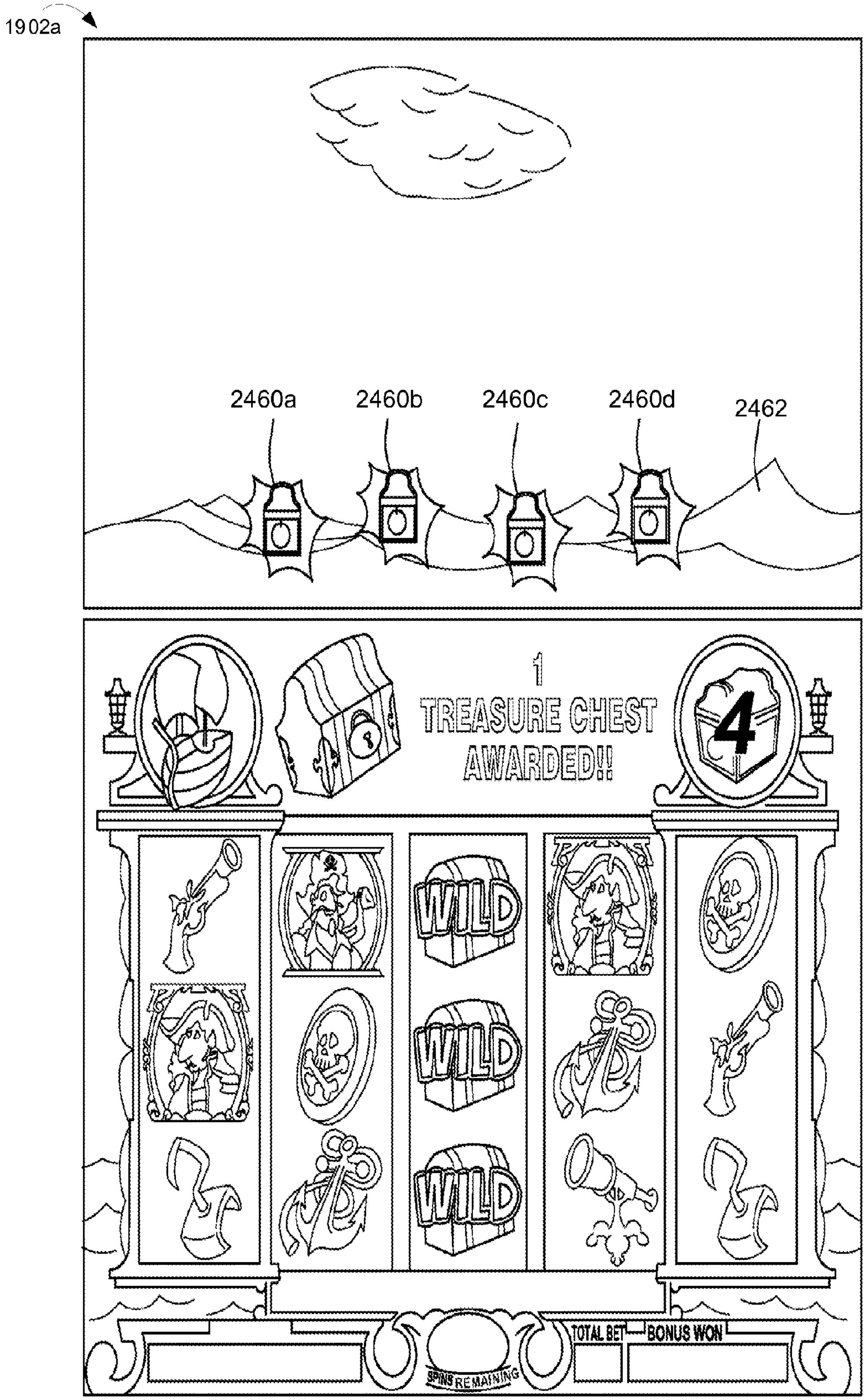

According to some example embodiments, a player (e.g., Player 1A of FIG. 23*a-d*) having a sunken pirate ship (e.g., pirate ship 1906*a*) may not fire cannonballs at opponents (e.g., Team 2) but may still collect treasure chests during the individual bonus spins. As shown in FIG. 24, for example, after Player 1A's pirate ship 1906*a* has been sunk, Player 1A achieves four additional treasure chests 2360*a-d* during subsequent bonus spins. The additional treasure chests 2360*a-d* are shown as floating on the water 2362. The floating treasure chests 2360*a-d* may be traded for a jackpot award. Furthermore, Player 1A may receive jackpot awards obtained by his or her teammates (e.g., Player 1B). However, the floating treasure chests 2360*a-d* may or may not be exchanged or converted into an individual credit award when the community game 111 is terminated.

Operating Environment

This section describes an example operating environment and presents structural aspects of some embodiments. This section includes discussion about wagering game machine architectures and wagering game networks

Wagering Game Machine Architecture

Figure 25:
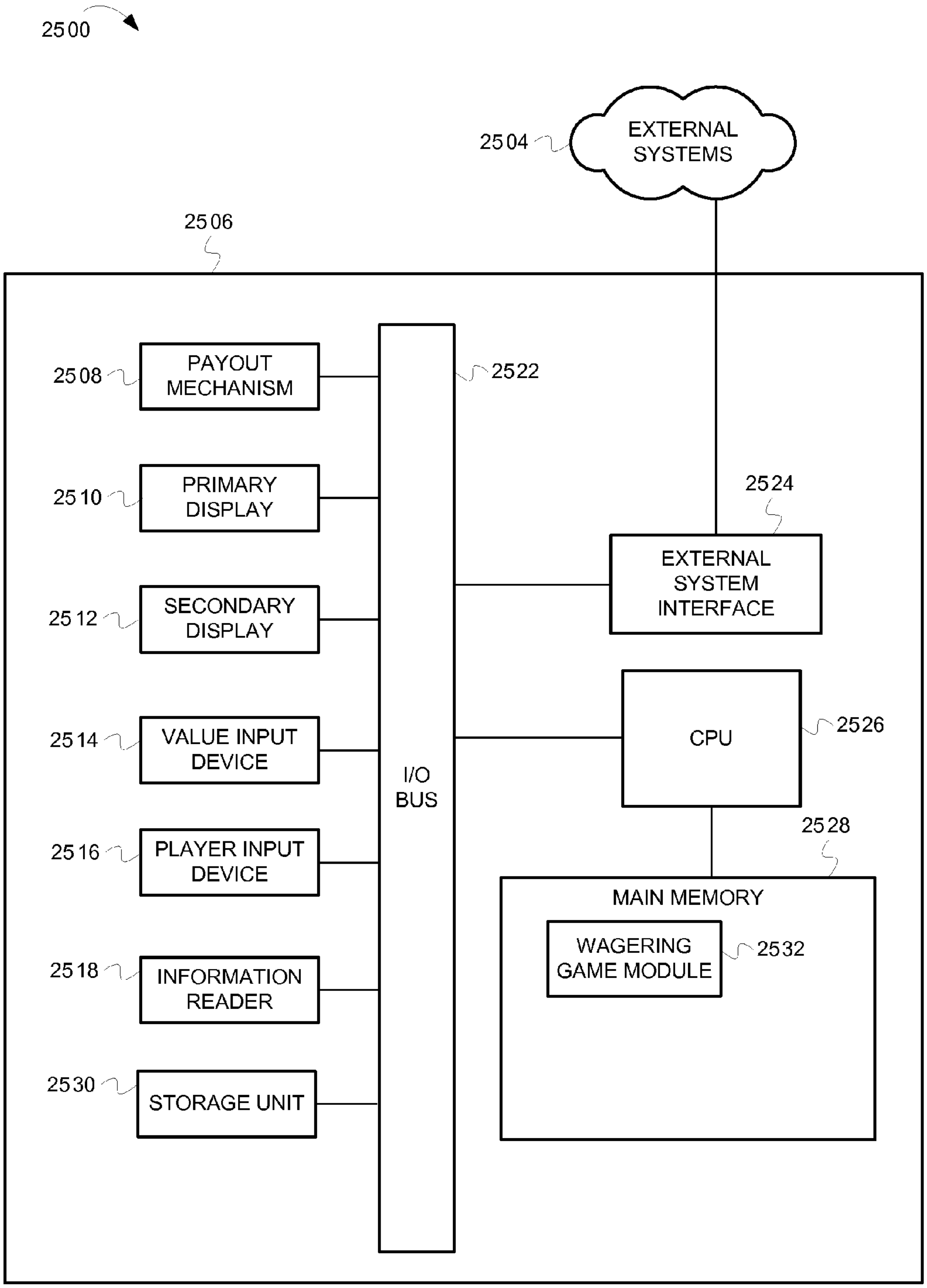
FIG. 25 depicts a block diagram illustrating a wagering game machine architecture, according to some example embodiments.

FIG. 25 depicts a block diagram illustrating a wagering game machine architecture, according to some example embodiments. As shown in FIG. 25, the wagering game machine architecture 2500 includes a wagering game machine 2506, which includes a central processing unit (CPU) 2526 connected to main memory 2528. The CPU 2526 can include any suitable processor, such as an Intel® Pentium processor, Intel® Core 2 Duo processor, AMD Opteron™ processor, or UltraSPARC processor. The main memory 2528 includes a wagering game module 2532. In one embodiment, the wagering game module 2532 can present wagering games, such as video poker, video black jack, video slots, video lottery, etc., in whole or part. Additionally, the wagering game module 2532 can perform the operations for community games (as described above).

The CPU 2526 is also connected to an input/output (I/O) bus 2522, which can include any suitable bus technologies, such as an AGTL+frontside bus and a PCI backside bus. The I/O bus 2522 is connected to a payout mechanism 2508, primary display 2510, secondary display 2512, value input device 2514, player input device 2516, information reader 2518, and storage unit 2530. The player input device 2516 can include the value input device 2514 to the extent the player input device 2516 is used to place wagers. The I/O bus 2522 is also connected to an external system interface 2524, which is connected to external systems 2504 (e.g., wagering game networks).

In one embodiment, the wagering game machine 2506 can include additional peripheral devices and/or more than one of each component shown in FIG. 25. For example, in one embodiment, the wagering game machine 2506 can include multiple external system interfaces 2524 and/or multiple CPUs 2526. In one embodiment, any of the components can be integrated or subdivided.

Any component of the architecture 2500 can include hardware, firmware, and/or machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

While FIG. 25 describes an example wagering game machine architecture, this section continues with a discussion wagering game networks.

Wagering Game Network

Figure 26:
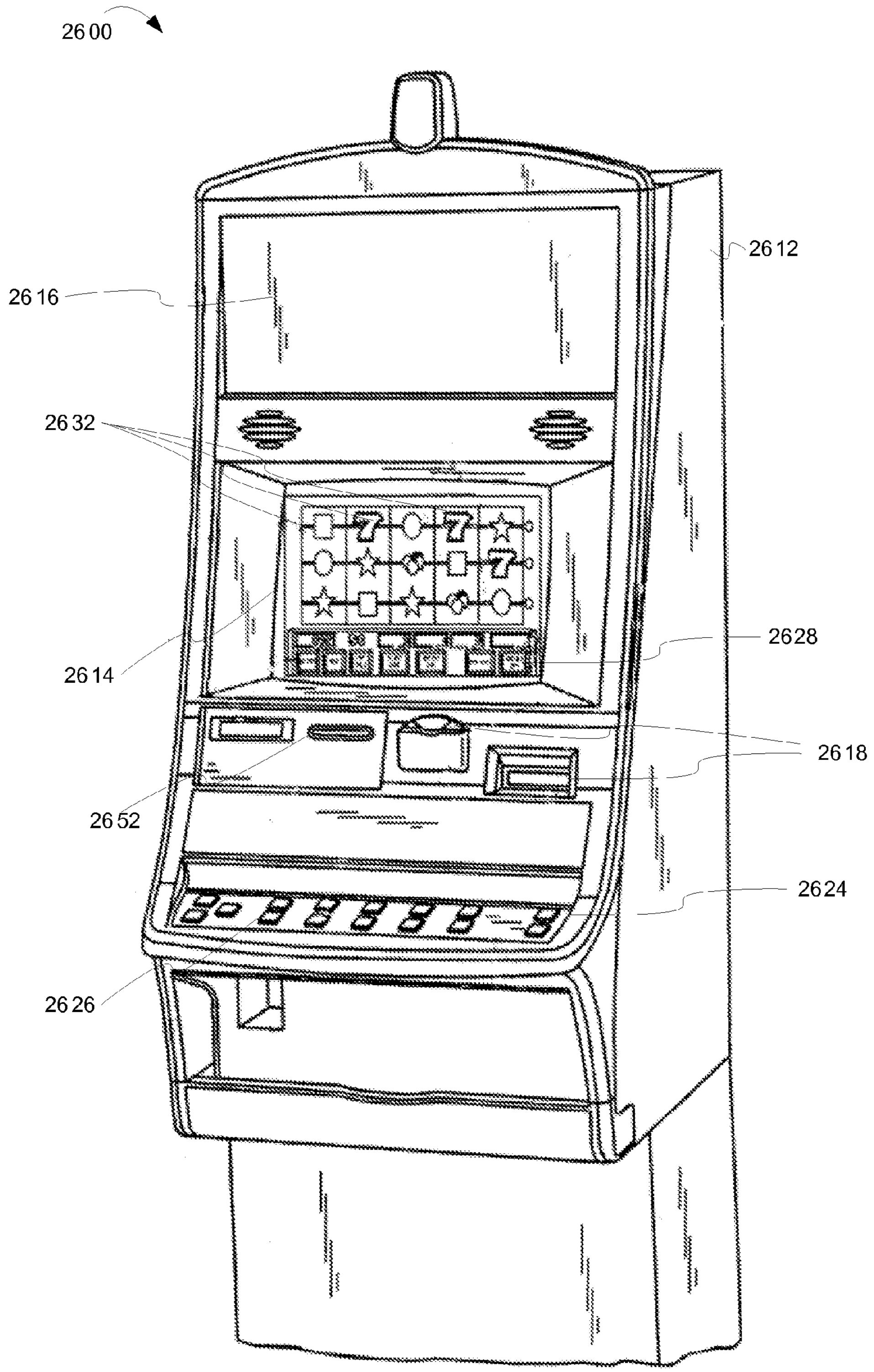
FIG. 26 depicts a block diagram illustrating a wagering game network 2600, according to some example embodiments.

FIG. 26 depicts a block diagram illustrating a wagering game network 2600, according to some example embodiments. As shown in FIG. 26, the wagering game network 2600 includes a plurality of casinos 2612 connected to a communications network 2614.

Each casino 2612 includes a local area network 2616, which includes an access point 2604, a wagering game server 2606, and wagering game machines 2602. The access point 26304 provides wireless communication links 2610 and wired communication links 2608. The wired and wireless communication links can employ any suitable connection technology, such as Bluetooth, 802.11, Ethernet, public switched telephone networks, SONET, etc. In some embodiments, the wagering game server 2606 can serve wagering games and distribute content to devices located in other casinos 2612 or at other locations on the communications network 2614.

The wagering game machines 2602 described herein can take any suitable form, such as floor standing models, handheld mobile units, bartop models, workstation-type console models, etc. Further, the wagering game machines 2602 can be primarily dedicated for use in conducting wagering games, or can include non-dedicated devices, such as mobile phones, personal digital assistants, personal computers, etc. In one embodiment, the wagering game network 2600 can include other network devices, such as accounting servers, wide area progressive servers, player tracking servers, and/or other devices suitable for use in connection with embodiments of the invention.

In some embodiments, wagering game machines 2602 and wagering game servers 2606 work together such that a wagering game machine 2602 can be operated as a thin, thick, or intermediate client. For example, one or more elements of game play may be controlled by the wagering game machine 2602 (client) or the wagering game server 2606 (server). Game play elements can include executable game code, lookup tables, configuration files, game outcome, audio or visual representations of the game, game assets or the like. In a thin-client example, the wagering game server 2606 can perform functions such as determining game outcome or managing assets, while the wagering game machine 2602 can present a graphical representation of such outcome or asset modification to the user (e.g., player). In a thick-client example, the wagering game machines 2602 can determine game outcomes and communicate the outcomes to the wagering game server 2606 for recording or managing a player's account.

In some embodiments, either the wagering game machines 2602 (client) or the wagering game server 2606 can provide functionality that is not directly related to game play. For example, account transactions and account rules may be managed centrally (e.g., by the wagering game server 2606) or locally (e.g., by the wagering game machine 2602). Other functionality not directly related to game play may include power management, presentation of advertising, software or firmware updates, system quality or security checks, etc.

Any of the wagering game network components (e.g., the wagering game machines 2602) can include hardware and machine-readable media including instructions for performing the operations described herein.

Example Wagering Game Machine

Figure 27:
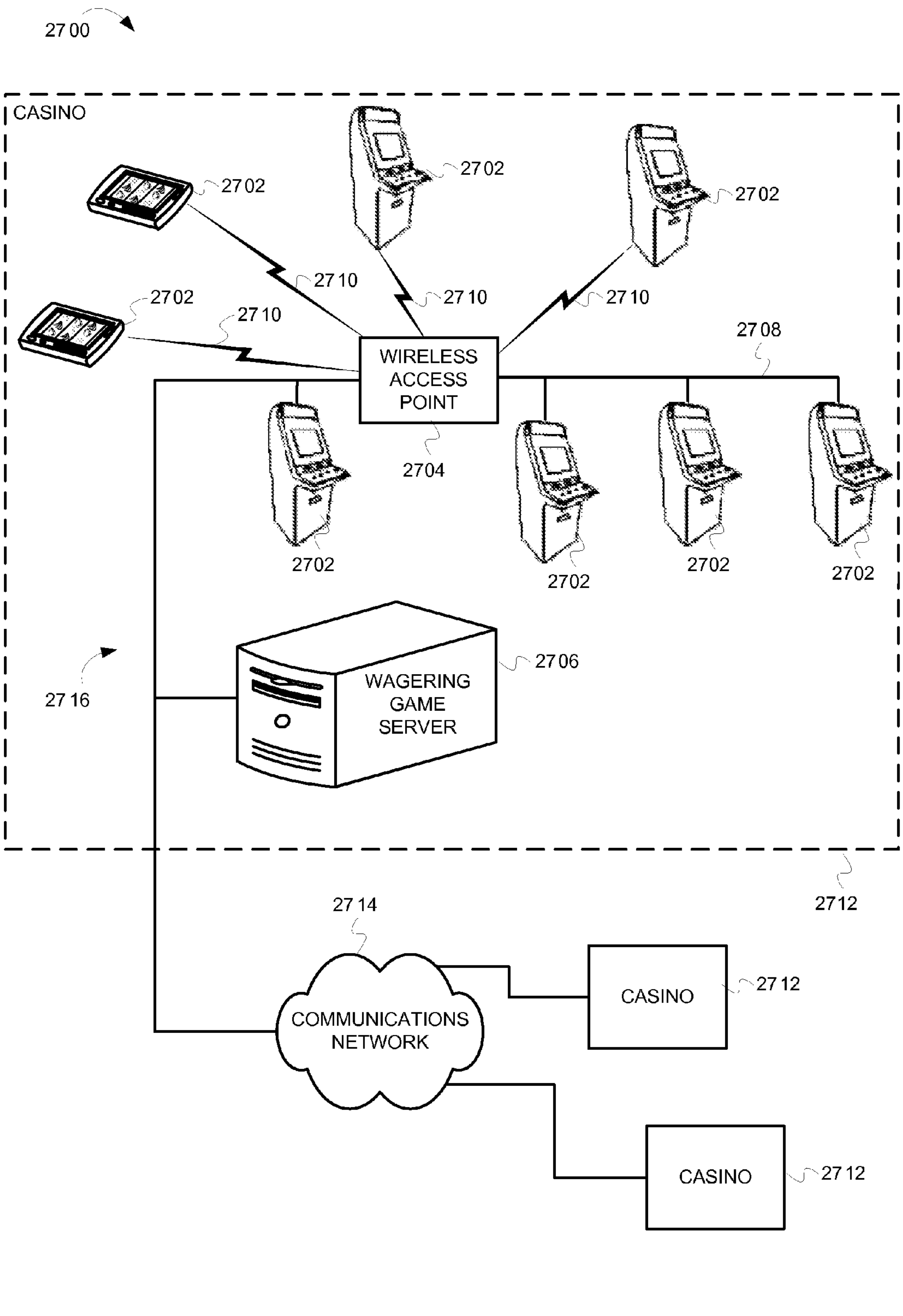
FIG. 27 depicts a perspective view of a wagering game machine, according to some example embodiments.

FIG. 27 depicts a perspective view of a wagering game machine, according to some example embodiments. Referring to FIG. 27, a wagering game machine 2700 is used in gaming establishments, such as casinos. According to embodiments, the wagering game machine 2700 can be any type of wagering game machine and can have varying structures and methods of operation. For example, the wagering game machine 2700 can be an electromechanical wagering game machine configured to play mechanical slots, or it can be an electronic wagering game machine configured to play video casino games, such as blackjack, slots, keno, poker, blackjack, roulette, etc.

The wagering game machine 2700 comprises a housing 2712 and includes input devices, including value input devices 2718 and a player input device 2724. For output, the wagering game machine 2700 includes a primary display 2714 for displaying information about a basic wagering game. The primary display 2714 can also display information about a bonus wagering game and a progressive wagering game. The wagering game machine 2700 also includes a secondary display 2716 for displaying wagering game events, wagering game outcomes, and/or signage information. While some components of the wagering game machine 2700 are described herein, numerous other elements can exist and can be used in any number or combination to create varying forms of the wagering game machine 2700.

The value input devices 2718 can take any suitable form and can be located on the front of the housing 2712. The value input devices 2718 can receive currency and/or credits inserted by a player. The value input devices 2718 can include coin acceptors for receiving coin currency and bill acceptors for receiving paper currency. Furthermore, the value input devices 2718 can include ticket readers or barcode scanners for reading information stored on vouchers, cards, or other tangible portable storage devices. The vouchers or cards can authorize access to central accounts, which can transfer money to the wagering game machine 2700.

The player input device 2724 comprises a plurality of push buttons on a button panel 2726 for operating the wagering game machine 2700. In addition, or alternatively, the player input device 2724 can comprise a touch screen 2728 mounted over the primary display 2714 and/or secondary display 2716.

The various components of the wagering game machine 2700 can be connected directly to, or contained within, the housing 2712. Alternatively, some of the wagering game machine's components can be located outside of the housing 2712, while being communicatively coupled with the wagering game machine 2700 using any suitable wired or wireless communication technology.

The operation of the basic wagering game can be displayed to the player on the primary display 2714. The primary display 2714 can also display a community game associated with the basic wagering game. The primary display 2714 can include a cathode ray tube (CRT), a high resolution liquid crystal display (LCD), a plasma display, light emitting diodes (LEDs), or any other type of display suitable for use in the wagering game machine 2700. Alternatively, the primary display 2714 can include a number of mechanical reels to display the outcome. In FIG. 27, the wagering game machine 2700 is an "upright" version in which the primary display 2714 is oriented vertically relative to the player. Alternatively, the wagering game machine can be a "slant-top" version in which the primary display 2714 is slanted at about a thirty-degree angle toward the player of the wagering game machine 2700. In yet another embodiment, the wagering game machine 2700 can exhibit any suitable form factor, such as a free standing model, bartop model, mobile handheld model, or workstation console model.

A player begins playing a basic wagering game by making a wager via the value input device 2718. The player can initiate play by using the player input device's buttons or touch screen 2728. The basic game can include arranging a plurality of symbols along a payline 2732, which indicates one or more outcomes of the basic game. Such outcomes can be randomly selected in response to player input. At least one of the outcomes, which can include any variation or combination of symbols, can trigger a community game.

In some embodiments, the wagering game machine 2700 can also include an information reader 2752, which can include a card reader, ticket reader, bar code scanner, RFID transceiver, or computer readable storage medium interface. In some embodiments, the information reader 2752 can be used to award complimentary services, restore game assets, track player habits, etc.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A method of conducting a wagering game on a gaming system, the method comprising: receiving, via an input device, wagers from a player to play respective plays of a plurality of plays of a wagering game; displaying the wagering game and event eligibility on at least one display device, the event eligibility including a time value and a multiplier value; increasing, by one or more controllers, at least one of the time value and the multiplier value as a function of the plurality of plays of the wagering game; decrementing the time value as time elapses; in response to a triggering event while the event eligibility is above an eligibility threshold, allowing, by the one or more controllers, the player to participate in one or more special events; and allowing the player to configure, via the input device, at least one of: i) a desired value of the multiplier value such that the time value, but not the multiplier value increases when the desired multiplier value is reached, ii) a maximum value of the time value such that the multiplier value, but not the time value, increases when the maximum time value is reached, iii) which one or more of the one or more special events the event eligibility is applied to, and iv) whether or not to save any portion of the event eligibility such that the saved portion can be applied to a future wagering game.

2. The method of claim 1, wherein a player's award in the one or more special events is multiplied by the multiplier value, wherein the method comprises decrementing the multiplier value as time elapses.

3. The method of claim 1, wherein the eligibility threshold is zero with respect to the time value.

4. The method of claim 1, wherein the function of the plurality of plays of the wagering game comprises a function of an amount of the wagers for the wagering game and a pace at which the wagers are received.

5. The method of claim 1, wherein the one or more special events comprises a community game that is initiated by the triggering event during play of the wagering game.

6. The method of claim 5, wherein the community game comprises online game play by at least one online player and land-based game play by at least one land-based player, wherein the at least one online player includes the player.

7. The method of claim 1, wherein the increasing includes alternately incrementing the time value and the multiplier value.

8. The method of claim 1, wherein allowing the player to configure which one or more of the one or more special events the event eligibility is applied to comprises allowing the player to configure percentage allocations of the event eligibility to the one or more special events.

9. One or more non-transitory machine-readable storage media including instructions which, when executed by one or more processors, cause the one or more processors to perform operations comprising: receiving, via an input device, wagers from a player to play respective plays of a plurality of plays of a wagering game; displaying the wagering game and event eligibility on at least one display device, the event eligibility including a time value and a multiplier value; increasing, by one or more controllers, at least one of the time value and the multiplier value as a function of the plurality of plays of the wagering game; decrementing the time value as time elapses; in response to a triggering event while the event eligibility is above an eligibility threshold, allowing, by the one or more controllers, the player to participate in one or more special events; and allowing the player to configure, via the input device, at least one of: i) a desired value of the multiplier value such that the time value, but not the multiplier value increases when the desired multiplier value is reached, ii) a maximum value of the time value such that the multiplier value, but not the time value, increases when the maximum time value is reached, iii) which one or more of the one or more special events the event eligibility is applied to, and iv) whether or not to save any portion of the event eligibility such that the saved portion can be applied to a future wagering game.

10. The one or more non-transitory machine-readable storage media of claim 9, wherein a player's award in the one or more special events is multiplied by the multiplier value, wherein the method comprises decrementing the multiplier value as time elapses.

11. The one or more non-transitory machine-readable storage media of claim 9, wherein the eligibility threshold is zero with respect to the time value.

12. The one or more non-transitory machine-readable storage media of claim 9, wherein the function of the plurality of plays of the wagering game comprises a function of an amount of the wagers for the wagering game and a pace at which the wagers are received.

13. The one or more non-transitory machine-readable storage media of claim 9, wherein the one or more special events comprises a community game that is initiated by the triggering event during play of the wagering game.

14. The one or more non-transitory machine-readable storage media of claim 13, wherein the community game comprises online game play by at least one online player and land-based game play by at least one land-based player, wherein the at least one online player includes the player.

15. The one or more non-transitory machine-readable storage media of claim 9, wherein the increasing includes alternately incrementing the time value and the multiplier value.

16. The one or more non-transitory machine-readable storage media of claim 9, wherein allowing the player to configure which one or more of the one or more special events the event eligibility is applied to comprises allowing the player to configure percentage allocations of the event eligibility to the one or more special events.

17. An apparatus comprising: at least one input device; at least one display device; at least one processor; at least one memory device configured to store instructions that, when executed by the at least one processor, cause the apparatus to: receive, via the input device, wagers from a player to play respective plays of a plurality of plays of a wagering game; display the wagering game and event eligibility on the at least one display device, the event eligibility including a time value and a multiplier value; increase at least one of the time value and the multiplier value as a function of the plurality of plays of the wagering game; decrement the time value as time elapses; in response to a triggering event while the event eligibility is above an eligibility threshold, allow the player to participate in one or more special events; and allow the player to configure, via the input device, at least one of: i) a desired value of the multiplier value such that the time value, but not the multiplier value increases when the desired multiplier value is reached, ii) a maximum value of the time value such that the multiplier value, but not the time value, increases when the maximum time value is reached, iii) which one or more of the one or more special events the event eligibility is applied to, and iv) whether or not to save any portion of the event eligibility such that the saved portion can be applied to a future wagering game.

18. The apparatus of claim 17, wherein a player's award in the one or more special events is multiplied by the multiplier value, wherein the method comprises decrementing the multiplier value as time elapses.

19. The apparatus of claim 17, wherein the eligibility threshold is zero with respect to the time value.

20. The apparatus of claim 17, wherein the function of the plurality of plays of the wagering game comprises a function of an amount of the wagers for the wagering game and a pace at which the wagers are received.

21. The apparatus of claim 17, wherein the one or more special events comprises a community game that is initiated by the triggering event during play of the wagering game.

22. The apparatus of claim 21, wherein the community game comprises online game play by at least one online player and land-based game play by at least one land-based player, wherein the at least one online player includes the player.

23. The apparatus of claim 17, wherein the increase of the at least one of the time value and the multiplier value, comprises an operation to alternately increment the time value and the multiplier value.

24. The apparatus of claim 17, wherein the allow of the player to configure which one or more of the one or more special events the event eligibility is applied comprises an operation to allow the player to configure percentage allocations of the event eligibility to the one or more special events.

* * * * *